United States Patent
Sugiyama (12)

(10) Patent No.: US 8,174,935 B2
(45) Date of Patent: *May 8, 2012

(54) ADAPTIVE ARRAY CONTROL DEVICE, METHOD AND PROGRAM, AND ADAPTIVE ARRAY PROCESSING DEVICE, METHOD AND PROGRAM USING THE SAME

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 536 days.

This patent is subject to a terminal disclaimer.

(21) Appl. No.: 12/297,870

(22) PCT Filed: Apr. 12, 2007

(86) PCT No.: PCT/JP2007/058091
§ 371 (c)(1),
(2), (4) Date: Oct. 20, 2008

(87) PCT Pub. No.: WO2007/123048
PCT Pub. Date: Nov. 1, 2007

(65) Prior Publication Data
US 2009/0086578 A1 Apr. 2, 2009

(30) Foreign Application Priority Data
Apr. 20, 2006 (JP) .................................. 2006-117287

(51) Int. Cl.
*G01S 3/86* (2006.01)
*G01S 3/80* (2006.01)
*G01S 3/808* (2006.01)
(52) U.S. Cl. ....................................................... 367/135
(58) Field of Classification Search .................. 367/135, 367/124; 342/383
See application file for complete search history.

(56) References Cited

U.S. PATENT DOCUMENTS
7,944,775 B2 * 5/2011 Sugiyama ..................... 367/135
2006/0122832 A1 6/2006 Takiguchi et al.
(Continued)

FOREIGN PATENT DOCUMENTS
JP 46-30624 9/1971
(Continued)

OTHER PUBLICATIONS
S. Affes et al., "Robust Adaptive Beamforming Via LMS-Like Target Tracking," IEEE Proceedings of International Conference on Acoustics, Speech and Signal Processing, vol. IV, pp. 269-272, Apr. 1994.
(Continued)

*Primary Examiner* — Daniel Pihulic
(74) *Attorney, Agent, or Firm* — Foley & Lardner LLP

(57) ABSTRACT

[Object] To provide an adaptive array control method, device, and program, and an adaptive array processing method, device, and program, capable of performing accurate coefficient update control independent of frequency characteristics and incoming directions of signals. [Achieving Means] The present invention is characterized as to array-process signals received from a plurality of pairs of sensors having a plurality of different sensor intervals, and using the array processing result, estimate interference power accurately. More specifically, the present invention includes a multiple blocking matrix circuit 320 which processes signals receiving from sensors having a plurality of different intervals, and an accurate coefficient update control is performed based on the output array-processed signal. Thereby, deterioration of output signals and breathing noises are reduced, and high-quality array processing can be performed.

26 Claims, 9 Drawing Sheets

U.S. PATENT DOCUMENTS

| | | | |
|---|---|---|---|
| 2009/0073040 A1* | 3/2009 | Sugiyama | 342/378 |
| 2009/0086578 A1* | 4/2009 | Sugiyama | 367/138 |
| 2009/0121934 A1* | 5/2009 | Sugiyama | 342/372 |
| 2010/0171662 A1* | 7/2010 | Sugiyama | 342/378 |

FOREIGN PATENT DOCUMENTS

| | | |
|---|---|---|
| JP | 54-81826 A | 6/1979 |
| JP | 56-102193 U | 8/1981 |
| JP | 58-88994 A | 5/1983 |
| JP | 08-122424 | 5/1996 |
| JP | 10-207490 | 8/1998 |
| JP | 11-052988 | 2/1999 |
| JP | 2000-181498 A | 6/2000 |
| JP | 2003-140700 A | 5/2003 |
| JP | 2003-232849 A | 8/2003 |
| JP | 2003-271191 A | 9/2003 |
| JP | 2003-333683 A | 11/2003 |
| JP | 2004-289762 A | 10/2004 |
| JP | 2005-77731 A | 3/2005 |
| JP | 2005-249816 A | 9/2005 |

OTHER PUBLICATIONS

M. Brandstein et al., "Microphone Arrays," Ch. 1, Fig. 1.1, Springer-Verlag, Berlin, 2001.

M. Brandstein et al., "Microphone Arrays," Ch. 5, Springer-Verlag, Berlin, 2001.

I. Claesson et al., "A Spatial Filtering Approach to Robust Adaptive Beaming," IEEE Transactions on Antennas and Propagation, vol. 40:9, Sep. 1992, pp. 1093-1096.

O.L. Frost, III, "An Algorithm for Linearly Constrained Adaptive Array Processing," Proceedings of the IEEE, vol. 60:8, Aug. 1972, pp. 926-935.

J. E. Greenberg et al., "Evaluation of an Adaptive Beamforming Method for Hearing Aids," J. Acoust. Soc. Am 91:3, Mar. 1992, pp. 1662-1676.

L. J. Griffiths, "An Alternative Approach to Linearly Constrained Adaptive Beamforming," IEEE Transactions on Antennas and Propagation, vol. AP-30:1, Jan. 1982, pp. 27-34.

O. Hoshuyama et al., "A Robust Generalized Sidelobe Canceller with a Blocking Matrix Using Leaky Adaptive Filters," IEEE Transactions of the Institute of Electronics, Information and Communication, vol. 79:9, Sep. 1996, pp. 1516-1524.

O. Hoshuyama et al., "A Realtime Robust Adaptive Microphone Array Controlled by an SNR Estimate," IEEE Proceedings of ICASSP, Apr. 1998, pp. 3605-3608.

O Hoshuyama et al., "An adaptive microphone array with good sound quality using auxiliary fixed beamformers and its DSP implementation," IEEE Proceedings of ICASSP, Mar. 1991, pp. 949-952.

S. Haykin, "Radar Array Processing for Angle of Arrival Estimation," Chapter 4, Array Signal Processing, Prentice-Hall, Englewood Clifs, 1993, pp. 194-292.

P. P. Vaidyanathan, "Multirate Systems and Filter Banks," Pt. 2, Chapter 5, IEEE Proceedings of ICASSP, pp. 189-271.

O Hoshuyama et al., "Robust Adaptive Beamforming" Microphone Arrays: Signal Processing Techniques and Applications, 2001, pp. 87-109, Springer, Berlin.

D. Ward et al., Constant Directivity Beamforming: Microphone Arrays: Signal Processing Techniques and Applications, 2001, pp. 3-5, Springer, Berlin.

Akihiko Sugiyama, USPTO Office Action, U.S. Appl. No. 12/297,869, Sep. 10, 2010, 6 pages.

Akihiko Sugiyama, USPTO Quayle Action, U.S. Appl. No. 12/297,869, Apr. 22, 2011, 4 pages.

Akihiko Sugiyama, USPTO Office Action, U.S. Appl. No. 12/297,871, Jan. 14, 2011, 8 pages.

Akihiko Sugiyama, USPTO Notice of Allowance, U.S. Appl. No. 12/297,871, Apr. 29, 2011, 5 pages.

Akihiko Sugiyama, USPTO Notice of Allowance, U.S. Appl. No. 12/297,853, Jan. 18, 2011, 5 pages.

Akihiko Sugiyama, USPTO Notice of Allowance, U.S. Appl. No. 12/297,869, Sep. 28, 2011, 6 pages.

* cited by examiner

ADAPTIVE ARRAY CONTROL DEVICE, METHOD AND PROGRAM, AND ADAPTIVE ARRAY PROCESSING DEVICE, METHOD AND PROGRAM USING THE SAME

This application is the National Phase of PCT/JP2007/058091, filed Apr. 12, 2007, which claims priority to Japanese Application No. 2006-117287, filed Apr. 20, 2006, the disclosures of which are hereby incorporated by reference in their entirety.

TECHNICAL FIELD

The present invention relates to an adaptive array control device, method and program for spatio-selectively receiving and processing incoming signals such as audio using a plurality of sensors, and an adaptive array processing device, method, and program using the same.

BACKGROUND ART

Conventionally, in the field of audio signal acquisition, sonars, and wireless communications, a speech enhancement device by means of an adaptive microphone array and a wireless transceiver by means of an adaptive antenna array have been known, for example.

Such a device is capable of enhancing and receiving only a particular signal from a plurality of signal sources, which is an application of an adaptive array technique. As sensors, microphones, ultrasonic sensors, sonar receivers, and radio wave antennas may be used. Here, a case of using microphones as sensors will be described.

Hereinafter, in order to simplify the description, a case where microphones are arranged on a line at equal interval will be considered. Further, it assumes that a target audio source is sufficiently distant from the line on which the microphones are arranged, and that the direction of the target audio source is orthogonal to the line.

A microphone array filters signals input to a plurality of microphones, and then adds them to form a spatial filter. With this spatial filter, only a signal incoming from a predefined direction, or a switch target signal, is enhanced, and signals other than the target signal are attenuated.

An adaptive microphone array is an array of microphones having a function of adaptively varying the spatial filter characteristics.

As a configuration of an adaptive microphone array, a "generalized sidelobe canceller" disclosed in Non-Patent Document 1, the configuration disclosed in Non-Patent Document 2, the configuration disclosed in Non-Patent Document 3, the "frost beamformer" disclosed in Non-Patent Document 4, and the configuration disclosed in Non-Patent Document 5, have been known, for example.

A generalized sidelobe canceller, which is a basic adaptive array processing device disclosed in Non-Patent Document 1, includes a fixed beamformer, a blocking matrix circuit, and a multi-input canceller.

The blocking matrix circuit includes an adaptive blocking matrix circuit including adaptive filters. The fixed beamformer processes a plurality of sensor signals and enhances a target signal. The blocking matrix circuit suppresses the target signal included in the plurality of sensor signals, and relatively enhances interferences.

The adaptive blocking matrix circuit subtracts a pseudo target signal generated by the adaptive filters from the plurality of the sensor signals with the fixed beamformer output being used as a reference signal, and supplies to a multi-input canceller. The adaptive filter coefficient of the adaptive blocking matrix circuit is to be updated so as to minimize an output of the adaptive blocking matrix circuit using the fixed beamformer output and an output of the adaptive blocking matrix circuit.

The multi-input canceller subtracts a pseudo interference generated by the adaptive filters from the fixed beamformer output with an output of the blocking matrix circuit being used as a reference signal. In the signal obtained by the subtraction processing, the target signal is enhanced and the interference is suppressed, which becomes an array device output. Through the subtraction processing, correlation of the output signal with respect to the interference is eliminated.

The adaptive filter coefficient of the multi-input canceller is updated to minimize the multi-input canceller output using the blocking matrix circuit output and the multi-input canceller output.

As the fixed beamformer, a delay-and-sum beamformer which delays respective sensor signals and adds them, a filter-and-sum beamformer which filters and adds them, may be used. Those fixed beamformers are described in Non-Patent Document 6 in detail.

The delay-and-sum beamformer delays a plurality of sensor signals for only the unique number of samples of each signal, and after multiplying a unique coefficient by each signal, calculates the sum and outputs it. The delay time of each signal is set such that after each sensor signal is delayed, the phases of the target signal included therein will become the same. Consequently, the target signal included in the output of the delay-and-sum beamformer is enhanced.

On the other hand, for the interference incoming from a direction different from that of the target signal, as the phases are different from each other in the respective delayed signals, the interferences are offset each other by addition and attenuated. As such, in the output of the delay-and-sum beamformer, the target signal is enhanced and the interferences are attenuated.

The filter-and-sum beamformer has a configuration such that delaying and constant multiplying with respect to sensor signals in the delay-and-sum beamformer are replaced with filters. Those filters can be made such that effects of delaying and constant multiplying in the delay-and-sum beamformer differ with respect to respective frequencies. As such, the target signal enhancing effect is more enhanced compared to that of the delay-and-sum beamformer with respect to signals in which spectrum is not flat.

The adaptive blocking matrix circuit and the multi-input canceller include a plurality of adaptive filters. As such adaptive filters, structures of FIR filters, IIR filters, and lattice filters may be used. Further, as a coefficient update algorithm of those adaptive filters, NLMS algorithm (learning identification method or normalized LMS algorithm), RLS algorithm (sequential minimum square method), a projection algorithm, a gradient method, an LS algorithm (minimum square method), a block adaptive algorithm, and adaptive algorithm of transform region may be used.

Further, when performing coefficient updating, a tap coefficient constraint adaptive algorithm applying constraint to a coefficient value to be newly calculated, a leak adaptive algorithm, and a tap norm constraint adaptive algorithm applying constraint to a coefficient value norm may be used. Those coefficient update algorithms with constraint are described in Non-Patent Document 7 in detail.

In the coefficient update of the adaptive blocking matrix circuit, the enhanced interference becomes an unnecessary signal for coefficient update, and in the coefficient update of the multi-input canceller, the enhanced target signal becomes an unnecessary signal for coefficient update, both of which disturb coefficient update. As such, in either case, the adaptive filter coefficient is disturbed, so that uncomfortable breathing noises are caused in the output signal of the array processing device.

In order to prevent the noises, it is necessary to make the coefficient update step size small. However, a small step size causes a delay of the speed with which the characteristics of the adaptive blocking matrix circuit follows the movement of the target signal, so that the quality of the adaptive array device output which is the final output is deteriorated.

In order to solve this problem, adaptive mode control devices are disclosed in Non-Patent Document 8 and Non-Patent Document 9.

Here, in the method disclosed in Non-Patent Document 8, presence of the interference is detected using correlation between signals obtained from adjacent sensors. By halting coefficient update when the interference is detected, a fine output of the adaptive array device can be obtained. In this method, as it is developed to be applied for hearing aid, microphone intervals are set to be wide, and the signal band is restricted from about 600 Hz to 1200 Hz to prevent spatial aliasing.

In an application by using normal audio signals, as the audio power may sometimes also be present outside this frequency range, presence of interferences cannot be detected accurately. Further, as it is configured to control coefficient update of only multi-input canceller while assuming a fixed blocking matrix circuit, it cannot be directly applied to the adaptive blocking matrix circuit.

In the method disclosed in Non-Patent Document 9, presence of interference is detected using a power ratio of the target signal to the interference (SIR). The power estimation of the target signals is performed using a fixed beamformer output. The power estimation of the interference is performed using an output of the adaptive blocking matrix circuit. The ratio of these estimation values (that is, estimation values of SIR) is compared with a threshold.

If the SIR (power ratio of target signal to interference) is larger than the threshold, as the target signal is prevailing in the input signal and effects of the target signal are small, coefficient update will be performed in the adaptive blocking matrix circuit. In contrast, as the target signal interrupts coefficient update of the multi-input canceller, coefficient update of the multi-input canceller is halted.

If SIR is smaller than the threshold, the coefficient update is halted in the adaptive blocking matrix circuit, and coefficient update is performed in the multi-input canceller.

In this method, however, the adaptive blocking matrix circuit does not exhibit sufficient performance until the adaptive filter coefficient included in the adaptive blocking matrix circuit is converged, so that estimation of the interference power becomes inaccurate. As such, particularly in the initial timing of operation, errors may be easily caused in the coefficient update control of the adaptive blocking matrix circuit and the multi-input canceller, leading to deterioration in the output audio of the array processing device.

In order to solve this problem, Non-Patent Document 10 discloses an adaptive mode control device having a dedicated fixed blocking matrix circuit.

In the method disclosed in Non-Patent Document 10, power estimation of interference is performed using a dedicated fixed blocking matrix circuit. As such, desired performance can be achieved irrespective of the convergence of the adaptive filter coefficient included in the adaptive blocking matrix circuit, which enables accurate interference power estimation.

Next, FIG. 8 shows an adaptive mode processing device of another conventional example.

The conventional example (adaptive mode processing device) shown in FIG. 8 is configured such that the above-described adaptive array processing device disclosed in Non-Patent Document 9 is combined with the adaptive mode control device disclosed in Non-Patent Document 10.

In this configuration, the adaptive array processing device disclosed in Non-Patent Document 9 includes a fixed beamformer 200, an adaptive blocking matrix circuit 300, a delay element 400, and a multi-input canceller 500. Further, the adaptive mode control device includes a blocking matrix circuit 310, an SIR estimation section 700, and a comparator section 800*a*.

The fixed beamformer 200 of the adaptive array processing device processes signals obtained from M pieces of sensors $100_0$ to $100_{M-1}$ to thereby enhance a target signal.

The adaptive blocking matrix circuit 300 suppresses the target signal included in the plurality of sensor signals, and relatively enhances interference. This is achieved by generating pseudo target signals by a plurality of adaptive filters with an output of the fixed beamformer 200 being used as a reference signal, and subtracting them from signals obtained from M pieces of the sensors $100_0$ to $100_{M-1}$. In that case, the coefficient of the adaptive filter is updated such that an output of the adaptive blocking matrix circuit 300 is minimized, by using an output of the fixed beamformer 200 and an output of the adaptive blocking matrix circuit 300.

The delay element 400 delays an output of the fixed beamformer 200 by L sample, and supplies it to the multi-input canceller 500. The value of L is set such that the phases of the target signal component in the output of the delay element 400 and the target signal component in the output of the adaptive blocking matrix circuit 300 become the same. For example, it may be set to the sum of the group delay time of the fixed beamformer 200 and a time corresponding to about one fourth to a half of the number of taps of the adaptive blocking matrix circuit 300.

The multi-input canceller 500 receives and performs processing on a signal formed by delaying the output signal of the fixed beamformer 200 and an output signal of the adaptive blocking matrix circuit 300 to thereby suppress interference, and further enhances the target signal relatively. The multi-input canceller 500 receives the enhanced interference as a reference signal from the adaptive blocking matrix circuit 300, and as a signal correlated to this signal, generates a pseudo interference by adaptive filters. The generated pseudo interference is subtracted from the enhanced target signal which is an output of the delay element 400. This output is transmitted to the output terminal 600.

The adaptive filter coefficient of the multi-input canceller 500 is updated, using the output of the adaptive blocking matrix circuit 300 and the output signal transmitted to the output terminal 600, so as to minimize the output signal.

The output of the adaptive blocking matrix circuit 300 to be used in coefficient update of the adaptive blocking matrix circuit 300 includes interference and a suppressed target signal. However, as the adaptive blocking matrix circuit 300 can affect only the target signal component, the interference is output as it is. In other words, the adaptive blocking matrix circuit 300 can minimize only the target signal component, and the interference component included in this output disturbs coefficient update.

With the disturbing, the adaptive filter coefficient included in the adaptive blocking matrix circuit 300 is disordered, so that the signal transmitted to the multi-input canceller 500 becomes unstable. As a result, the output of the multi-input canceller 500, that is, the output of the entire adaptive array device, is disturbed, causing uncomfortable breathing noises.

In order to prevent the noises, SIR is estimated using the plurality of sensor signals, and the coefficient update of the adaptive blocking matrix circuit 300 is controlled using the estimated value.

Similarly, the target signal enhanced in the coefficient update of the multi-input canceller 500 becomes an unnecessary signal for coefficient update, disturbing the coefficient update. With the disturbing, the adaptive filter coefficient included in the multi-input canceller 500 is disordered, causing uncomfortable breathing noises in the adaptive array device output. As such, same as the adaptive blocking matrix circuit 300, SIR of the plurality of sensor signals is estimated, and coefficient update of the multi-input canceller 500 is controlled with the estimated value.

The SIR estimation section 700 performs SIR estimation using the output of the blocking matrix circuit 310 and the output of the fixed beamformer 200.

Power estimation of the target signal is performed using the output of the fixed beamformer 200. Power estimation of the interference is performed using the output of the fixed blocking matrix circuit 310. The two pieces of estimated power information are supplied to the SIR estimation section 700, and the ratio is calculated to serve as an estimated SIR value.

The estimated SIR value calculated by the SIR estimation section 700 is transmitted from the SIR estimation section 700 to the comparator section 800. The comparator section 800a compares the estimated SIR value with a threshold.

If the estimated SIR value is larger than the threshold, as the target signal is prevailing in the input signal so that effect of the interference is small, a control signal for performing coefficient update in the adaptive blocking matrix circuit is generated, and the signal is supplied to the adaptive blocking matrix circuit 300. In contrast, as the target signal disturbs in the coefficient update of the multi-input canceller 500, a control signal for halting coefficient update of the multi-input canceller 500 is generated, and the signal is supplied to the multi-input canceller 500.

If the estimated SIR value is smaller than the threshold, coefficient update is halted in the adaptive blocking matrix circuit, and a signal for performing coefficient update in the multi-input canceller is generated and supplied to the adaptive blocking matrix circuit 300 and the multiple input canceller 500, respectively.

FIG. 9 shows an exemplary configuration of the fixed blocking matrix circuit 310, which is configured of a subtracter 311 for calculating the difference between the $i^{th}$ sensor signal $X_i(k)$ and the $(i+1)^{th}$ sensor signal $X_{i+1}(k)$.

Here, k is an indicator showing the time, and i is an integer in a range from 0 to M−2. The output signal Z(k) of the blocking matrix circuit 310 becomes $X_i(k)-X_{i+1}(k)$. With respect to the target signal incoming from the front, $X_i(k)$ and $X_{i+1}(k)$ are equal, so that Z(k)=0 is established. With respect to interference incoming from another direction, Z(k) is not zero. As such, the fixed blocking matrix circuit 310 has an advantage of suppressing the target signal.

Non-Patent Document 1: IEEE TRANSACTIONS ON ANTENNAS AND PROPAGATION, VOL. 30, NO. 1, PP. 27-34, January 1982

Non-Patent Document 2: IEEE TRANSACTIONS ON ANTENNAS AND PROPAGATION, VOL. 40, NO. 9, PP. 1093-1096, September 1992

Non-Patent Document 3: THE TRANSACTIONS OF THE INSTITUTE OF ELECTRONICS, INFORMATION AND COMMUNICATION ENGINEERS A, VOL. 79, NO. 9, PP. 1516-1524, September 1996

Non-Patent Document 4: PROCEEDINGS OF IEEE, VOL. 60, No. 8, PP. 926-935, August 1972

Non-Patent Document 5: IEEE PROCEEDINGS OF INTERNATIONAL CONFERENCE ON ACOUSTICS, SPEECH, AND SIGNAL PROCESSING, VOL. IV, PP. 269-272, April, 1994

Non-Patent Document 6: CH. 4, ARRAY SIGNAL PROCESSING, PRENTICE-HALL, ENGLEWOOD CLIFS, 1993

Non-Patent Document 7: MICROPHONE ARRAYS, SPRINGER, 2001

Non-Patent Document 8: JOURNAL OF ACOUSTICAL SOCIETY OF AMERICA, VOL. 91, NO. 3, PP. 1662-1676, March 1992

Non-Patent Document 9: IEEE PROCEEDINGS OF ICASSP, PP. 3605-3608, APRIL 1998

Non-Patent Document 10: IEEE PROCEEDINGS OF ICASSP, PP. 949-952, MARCH 1999

DISCLOSURE OF THE INVENTION

Problems to be Solved by the Invention

In the above-described conventional example, in order to prevent distortion which may be caused due to spatial aliasing, the maximum interval between sensors arranged in an array is set depending on the wavelength and the sound speed. Further, in practice, the number M of sensors also has the upper limit. As such, the frequency characteristics of the fixed blocking matrix circuit performing the power estimation of the interference are not flat, and the selectivity based on the direction is not sufficient.

As such, in the conventional art, errors may easily be caused in the power estimation according to the frequency characteristics and the incoming directions of the interferences. Whereby, there has been a problem of causing the performance degradation due to inappropriate coefficient update control of the adaptive array processing device.

Object of the Invention

It is an object of the present invention to provide an adaptive array controlling method, device, and program, capable of solving inconveniences involved in the conventional example, and in particular, enabling accurate coefficient update control without being influenced by the frequency characteristics and incoming directions of interferences to thereby realize a high-quality array processing output less influenced by the frequency characteristics and incoming directions of input signals, and an adaptive array processing device, method and program using it.

Means for Solving the Problems

In order to solve the object, an adaptive array control device according to the present invention includes: an array processing section which specifies a plurality of pairs of sensors having different sensor intervals from a plurality of signals transmitted from a plurality of sensors arranged in an array, array-processes signals acquired from respective pairs of sensors, and outputs a result as an array-processed signal; and an arithmetic control section which generates a control signal for controlling speed and accuracy of parameter adjustment in adaptive array processing using the output signal of the array processing section.

With this configuration, it is possible to perform signal extraction accurately irrespective of the frequency characteristics and incoming direction of signals, whereby high-quality array processing can be output-controlled effectively.

The array processing section may include a plurality of filters for filtering the respective array processing results, and an adder which adds and outputs filter outputs.

Further, an array processing section which receives a first array-processed signal generated by enhancing a target signal, among the plurality of signals transmitted from the plurality of sensors arranged in an array, with respect to other signals and outputs the array-processed signal, is set to be a second array processing signal which outputs a second array-processed signal. Further, a calculation section which calculates a relative magnitude relationship between the second array-processed signal and the received first array processed signal is provided. Further, the arithmetic control section may have a control signal generating function to generate a control signal for controlling speed and accuracy of parameter adjustment in the adaptive array processing using the magnitude relationship of the processed signals calculated by the calculation section.

Further, the adaptive array control device may be configured to include an estimation section which receives a first array-processed signal generated by enhancing a target signal, among the plurality of signals transmitted from the plurality of sensors arranged in an array, with respect to other signals, and estimates a ratio of the target signal to interference (SIR) according to the received first array-processed signal, and the arithmetic control section has a control signal generating function to generate a control signal for controlling speed and accuracy of parameter adjustment in adaptive array processing using the estimated SIR estimate value.

According to the adaptive array control device of the present invention configured as described above, signal extraction can be performed accurately irrespective of the frequency characteristics and incoming directions of signals, whereby high-quality array processing can be output-controlled.

Further, as the adaptive array control device of the present invention can estimate interference power effectively by the array processing section or the second array processing section with use of output from a group of sensors having a plurality of different sensor intervals for example, characteristics of high flatness in which different frequency characteristics and spatial selective characteristics are combined can be realized, so that interference power can be estimated accurately. Thereby, it is possible to perform coefficient update control (parameter adjustment in array processing) of the adaptive array processing device, so that high-quality array processing less influenced by the frequency characteristics and incoming directions of interferences can be output-controlled.

Further, an adaptive array controlling method according to the present invention includes: an array-processed signal generation step for array-processing a signal acquired from a plurality of pairs of sensors having different sensor intervals from a plurality of signals transmitted from a plurality of sensors arranged in an array to thereby acquire an array-processed result, and making the array-processed result into an array-processed signal in which a target signal is attenuated with respect to other signals; and an adaptive array processing step for controlling speed and accuracy of parameter adjustment in adaptive array processing using the array-processed signal.

As such, with this configuration, signal extraction can be performed accurately irrespective of the frequency characteristics and incoming directions of signals, whereby high-quality array processing can be output-controlled, which is the same as the case of above-described adaptive array control device.

The execution content of the array-processed signal generation step may be configured to array-process signals acquired from a plurality of pairs of sensors having different sensor intervals to thereby acquire array-processed results, filter the array-processed results to thereby acquire a plurality of filtering results, and add the plurality of filtering results to thereby generate the array-processed signal.

Further, a first array-processed signal acquiring step for receiving a first array-processed signal generated by enhancing a target signal, among a plurality of signals transmitted from a plurality of sensors arranged in an array, with respect to other signals is provided. The array-processed signal generation step is set as a second array-processed signal generation step, and before the adaptive array processing step, a magnitude relationship specifying step for comparing the received first array-processed signal with the second array-processed signal generated in the second array-processed signal generation step to thereby specify a relative magnitude relationship thereof is provided. The execution content of the adaptive array processing step may be configured to control speed and accuracy of parameter adjustment in adaptive array processing using magnitude relationship of respective processed signals specified in the magnitude relationship specifying step.

Further, the method further includes a first array-processed signal acquiring step for receiving a first array-processed signal generated by enhancing a target signal, among a plurality of signals transmitted from a plurality of sensors arranged in an array, with respect to other signals, and the array-processed signal generation step is set as a second array-processed signal generation step, and before the adaptive array processing step, an SIR estimation step for estimating a ratio of a target signal to interference (SIR) using the received first array-processed signal and the second array-processed signal generated in the second array-processed signal generation step is provided. The execution content of the adaptive array processing controlling step may be configured to control speed and accuracy of parameter adjustment in adaptive array processing using the SIR estimate value estimated in the SIR estimation step.

As described above, as the adaptive array controlling method of the present invention is configured as described above, a high-quality array processing output, which is almost the same as that of the above-described respective array control devices, can be controlled. In particular, there is an advantage that the adaptive array processing step functions effectively, whereby array processing control can be performed smoothly.

The adaptive array control program of the present invention is configured to cause a computer to execute: a first array-processed signal receiving processing to receive a first array-processed signal which is generated by enhancing a target signal, among a plurality of signals transmitted from a plurality of sensors arranged in an array, with respect to other signals; a second array-processed signal generation processing to generate a result of array-processing a signal acquired from a plurality of pairs of sensors having different sensor intervals, among the plurality of signals, as a second array-processed signal in which the target signal is attenuated with respect to other signals; a magnitude relationship specifying processing to acquire a relative magnitude relationship between the received first array-processing signal and the generated second array-processing signal; and an adaptive array processing to control speed and accuracy of parameter adjustment in the adaptive array processing using the specified magnitude relationship.

Even with this configuration, a program for adaptive array control which functions as almost the same as the adaptive array control device described above can be acquired.

Further, an adaptive array processing device of the present invention includes an array processing section which array-processes a signal acquired from a plurality of pairs of sensors having different sensor intervals among a plurality of signals transmitted from a plurality of sensors arranged in an array, and outputs a result as an array-processed signal.

Accordingly, with this configuration, signal extraction can be performed accurately irrespective of the frequency characteristics and incoming directions of signals, whereby high-quality array processing outputs can be acquired.

The array processing section may include a plurality of filters for filtering respective array processing results, and an adder which adds outputs of the filters, and outputs it.

Further, the adaptive array processing device of the present invention includes: a first array processing section which enhances a target signal, among a plurality of signals transmitted from a plurality of sensors arranged in an array, with respect to other signals to thereby acquire a first array-processed signal; a third array processing section which attenuates the target signal with respect to other signals to thereby acquire a third array processing signal; a correlation elimination section which eliminates a signal component correlated to the third array-processing signal from the first array-processed signal; a second array-processing section which outputs a result of array-processing signals acquired from a plurality of pairs of sensors having different sensor intervals, among the plurality of signals, as a second array-processed signal; and an arithmetic control section which generates a control signal for controlling speed and accuracy of parameter adjustment in adaptive array processing using output signals of the second array processing section.

Further, an adaptive array processing device of the present invention includes: a first array processing generation section which enhances a target signal, among a plurality of signals transmitted from a plurality of sensors arranged in an array, with respect to other signals to thereby generate a first array processed signal; a third array processing generation section which attenuates the target signal with respect to other signals to thereby generate a third array-processed signal; a correlation elimination section which eliminates a signal component correlated to the third array-processed signal from the first array-processed signal; a second array processing section which outputs a result of array-processing a signal acquired from a plurality of pairs of sensors having different sensor intervals, among the plurality of signals, as a second array-processed signal; a calculation section which calculates a relative magnitude relationship between the first array-processed signal and the second array-processed signal; and an arithmetic control section which generates a control signal for controlling speed and accuracy of parameter adjustment in adaptive array processing using a magnitude relationship between the first and second array-processing signal.

Further, an adaptive array processing device of the present invention includes: a first array processing generation section which enhances a target signal, among a plurality of signals transmitted from a plurality of sensors arranged in an array, with respect to other signals to thereby generate a first array-processed signal; a third array processing generation section which attenuates the target signal with respect to other signal to thereby generate a third array-processed signal; a correlation elimination section which eliminates a signal component correlated to the third array-processed signal from the first array-processed signal; a second array processing section which outputs a result of array-processing a signal acquired from a plurality of pairs of sensors having different sensor intervals, among the plurality of signals, as a second array-processed signal; an SIR estimation section which estimates a ratio of a target signal to interference (SIR) using the second array-processed signal; and an arithmetic control section which generates a control signal for controlling speed and accuracy of parameter adjustment in adaptive array processing using the SIR estimate value estimated by the SIR estimation section.

Further, the second array processing section may include a plurality of filters for filtering the array processing results, and an adder which adds outputs of the filters, and outputs it.

According to the respective adaptive array processing devices of the present invention configured as described above, signal extraction can be performed accurately irrespective of the frequency characteristics and incoming directions of signals, whereby high-quality array processing outputs can be acquired.

Further, as the adaptive array control devices of the present invention can estimate interference power by the array processing section or the second array processing section with use of output from a group of sensors having a plurality of different sensor intervals for example, characteristics of high flatness in which different frequency characteristics and spatial selective characteristics are combined can be realized, so that interference power can be estimated accurately. Thereby, it is possible to perform coefficient update control (parameter adjustment in array processing) of the adaptive array processing device properly, so that high-quality array processing less influenced by the frequency characteristics and incoming directions of interferences can be output-controlled.

Further, an adaptive array processing method according to the present invention includes: an array-processed signal generation step for array-processing a signal acquired from a plurality of pairs of sensors having different sensor intervals with respect to a plurality of signals transmitted from a plurality of sensors arranged in an array to thereby generate an array-processed signal; and an array processed signal outputting step for outputting the array processing result obtained in the array-processed signal generation step as an array-processed signal, and the execution content of the array-processed signal generation step is configured to generate the array-processed signal in a state that a target signal among the plurality of signals is attenuated with respect to other signals.

Accordingly, with this configuration, signal extraction can be performed accurately irrespective of the frequency characteristics and incoming directions of signals, which is the same as the case of the above-described adaptive array control device, whereby high-quality array processing outputs can be acquired.

Further, an adaptive array processing method of the present invention includes: an array-processed signal generation step for array-processing a signal acquired from a plurality of pairs of sensors having different sensor intervals with respect to a plurality of signals transmitted from a plurality of sensors arranged in an array to thereby generate an array-processed signal; and an array-processed signal outputting step for outputting an array processing result in the array-processed signal generation step as an array-processed signal. The execution content of the array-processed signal generation step is configured to filter the array processing results to acquire a plurality of filtering results, and to add the plurality of filtering results to thereby generate the array-processed signal.

Further, an adaptive array processing method of the present invention includes: a first array-processed signal generation step for enhancing a target signal, among a plurality of signals transmitted from a plurality of sensors arranged in an array, with respect to other signals to thereby generate a first array-processed signal; a third array-processed signal generation step for attenuating the target signal with respect to other signals to thereby generate a third array-processed signal; a second array-processed signal generation step for, when eliminating a signal component correlated to the third array-processed signal from the first array-processed signal and outputting the first array-processed signal, array-processing a signal acquired from a plurality of pairs of sensors having different sensor intervals with respect to the plurality of received array signals to acquire an array processing result, and setting the array processing results as a second array-processed signal in which the target signal is attenuated with respect to other signals; and an adaptive array processing controlling step for controlling speed and accuracy of parameter adjustment in adaptive array processing using the second array-processed signal.

Further, an adaptive array processing method of the present invention includes: a first array-processed signal generation step for enhancing a target signal, among a plurality of signals transmitted from a plurality of sensors arranged in an array, with respect to other signals to thereby generate a first array-processed signal; a third array-processed signal generation step for attenuating the target signal with respect to other signals to thereby generate a third array-processed signal; a second array-processed signal generation step for, when eliminating and outputting a signal component correlated with the third array-processed signal from the first array-processed signal, array-processing a signal acquired from a plurality of pairs of sensors having different sensor intervals with respect to the plurality of received array signals to acquire an array processing result, and setting the array processing result as a second array-processed signal in which the target signal is attenuated with respect to the other signals; a magnitude relationship specifying step for calculating a relative magnitude relationship between the first array-processed signal and the second array-processed signal; and an adaptive array processing controlling step for controlling speed and accuracy of parameter adjustment in adaptive array processing using the specified magnitude relationship.

Further, an adaptive array processing method of the present invention includes: a first array-processed signal generation step for enhancing a target signal, among a plurality of signals transmitted from a plurality of sensors arranged in an array, with respect to other signals to thereby generate a first array-processed signal; a third array-processed signal generation step for attenuating the target signal with respect to other signals to thereby generate a third array-processed signal; a second array-processed signal generation step for, when eliminating a signal component correlated to the third array-processed signal from the first array-processed signal and outputting the first array-processed signal, array-processing a signal acquired from a plurality of pairs of sensors having different sensor intervals with respect to the plurality of received array signals to acquire an array processing result, and setting the array processing result as a second array-processed signal in which the target signal is attenuated with respect to the other signals; an SIR estimation step for estimating a ratio of the target signal to the interference (SIR) using the second array-processed signal; and an adaptive array processing controlling step for controlling speed and accuracy of parameter adjustment in adaptive array processing using the estimated SIR estimate value.

The execution content of the second array-processed signal generation step may be configured to filter the respective array processing results to acquire a plurality of filtering results, and to acquire the second array-processed signal using the sum of the plurality of filtering results.

As the adaptive array controlling method of the present invention is configured as described above, a high-quality array processing output, which is almost the same as the case of above-described respective array control devices, can be controlled. In particular, there is an advantage that as the adaptive array processing step functions effectively, array processing control can be performed smoothly.

Further, as the adaptive array control methods of the present invention can estimate interference power in the array processing step or the second array processing step with use of output from a group of sensors having a plurality of different sensor intervals for example, characteristics of high flatness in which different frequency characteristics and spatial selective characteristics are combined can be realized, so that interference power can be estimated accurately. Thereby, it is possible to perform coefficient update control (parameter adjustment in array processing) of the adaptive array processing device properly, so that high-quality array processing outputs less influenced by the frequency characteristics and incoming directions of interferences can be obtained.

Further, an adaptive array processing program of the present invention is configured to cause a computer to execute: a first array-processed signal generating function to enhance a target signal, transmitted from a plurality of sensors arranged in an array, among a plurality of signals transmitted from a plurality of sensors arranged in an array, with respect to other signals to thereby acquire a first array-processed signal; a third array-processed signal generating function to attenuate the target signal with respect to the other signals to thereby generate a third array-processed signal; a correlated component elimination function to eliminate and output a signal component correlated to the third array-processed signal from the first array-processed signal; a second array-processed signal specifying function to set a plurality of pairs of sensors having different sensor intervals from the plurality of signals arranged in an array, and specify a result of array-processing a signal acquired from a plurality of sensors as a second array-processed signal in which the target signal is attenuated with respect to the other signals; a magnitude relationship specifying function to specify a relative magnitude relationship between the first array-processed signal and the second array-processed signal; and an adaptive array-processed controlling function to control speed and accuracy of parameter adjustment in adaptive array processing using the specified magnitude relationship.

Even with this configuration, a program for adaptive array processing which functions in the same manner as the execution content of the above-described adaptive array processing device can be acquired.

Effects of the Invention

According to the present invention, as the interference power is estimated with use of outputs of a group of sensors having a plurality of different sensor intervals, characteristics of high flatness in which different frequency characteristics and spatial selective characteristics are combined can be realized, so that interference power can be estimated accurately. As such, it is possible to perform coefficient update control (parameter adjustment in array processing) of the adaptive array processing device properly, so that execution of high-quality array processing less influenced by the frequency characteristics and incoming directions of interferences can be controlled. Thereby, excellent adaptive array controlling methods, devices, and programs capable of acquiring high-quality array processing outputs which have never been achieved conventionally, and adaptive array processing devices, methods and programs using them, can be realized.

BEST MODE FOR CARRYING OUT THE INVENTION

Next, exemplary embodiments of an adaptive array control device according to the invention and an adaptive array processing device using it will be described according to FIGS. 1 to 7.

The exemplary embodiments shown in FIGS. 1 to 7 of the invention is characterized as to perform array processing on received signals of a plurality of pairs of sensors having different sensor intervals, and by using the obtained array processing results, to estimate interference power accurately. More specifically, the present invention is characterized as to include a multiple blocking matrix circuit which receives and processes signals from a plurality of sensors having different intervals.

Hereinafter, the exemplary embodiments will be described in detail.

(First Exemplary Embodiment)

FIGS. 1 to 6 show a first exemplary embodiment of an adaptive array processing device according to the invention.

First, referring to FIG. 1, an adaptive array processing device according to the first exemplary embodiment includes a fixed beamformer 200 serving as a first array-processed signal generating section which processes to enhance a target signal, included in a plurality of signals transmitted from a group of M pieces of sensors $100_0$ to $100_{M-1}$ arranged in an array, with respect to other signals to thereby generate a first array-processed signal, and a multiple blocking matrix circuit 320 serving as a second array-processed signal generating section which attenuates the target signal with respect to the other signals to thereby generate a second array-processed signal.

The multiple blocking matrix circuit (second array-processed signal generating section) 320 has a sensor pair difference output function to set a plurality of pairs of sensors having different sensor intervals from a plurality of pieces of array sensor information transmitted from the group of M pieces of sensors $100_0$ to $100_{M-1}$ arranged in an array, and to calculate output differences of the pairs of sensors and output them.

Further, the multiple blocking matrix circuit (second array-processed signal generating section) 320 includes a plurality of filters for filtering the output differences respectively and an adder for adding the filter outputs, and has an addition result output function to externally output the addition result of the adder.

Further, the adaptive array processing device includes an SIR estimating section 700 which estimates a ratio of interferences to the target signal according to the first corrected array-processed signal, an adaptive blocking matrix circuit (third array-processed signal generating section) 300, a multi-input canceller (adaptive array processing section) 500 which applies adaptive array processing to the first array-processed signal corresponding to the estimated value estimated by the SIR estimation section 700 and eliminate the influence of the interferences to thereby enhance and output the first array-processed signal, an arithmetic control section 800 which controls operation of the adaptive blocking matrix circuit 300 and the multipole input canceller 500 and controls coefficient update and the like of an adjustment parameters to be in an optimum state based on the control information from the SIR estimation section 700 so as to realize a high-quality array processing output from the multipole input canceller (adaptive array processing section) 500, and a delaying element 400 which delays and transmits the first array-processed signal to the multipole input canceller 500. Note that the arithmetic control section 800 also has a function as a comparator section 800a shown in the above-described FIG. 8.

Note that the multiple blocking matrix circuit 320, the SIR estimating section 700, and the arithmetic control section 800 also serving as the comparator section 800a configure an adaptive mode control unit (adaptive array control device) 1200.

The multi-input canceller 500 is configured to have a function as a correlation elimination section which eliminates a signal component correlating to the second array-processed signal from the first array-processed signal to thereby enhance and output the first array-processed signal.

Further, the SIR estimating section 700 may be configured to estimate and specify a ratio of the target signal to the interference (SIR) according to the second array-processed signal generated by the multiple blocking matrix circuit (second array-processed signal generating section) 320 and the first corrected array-processed signal.

Further, the SIR estimating section 700 may be replaced with a calculation section (not shown) which calculates the relative magnitude relationship between the first array-processed signal and the second array-processed signal.

Further, the arithmetic control unit 800 has a control signal generating function to generate a control signal for controlling the speed and accuracy of parameter adjustment in adaptive array processing according to information of the relative magnitude relationship between the first array-processed signal and the second array-processed signal, and a function (adaptive array processing controlling function) to operate-control, using the control signal, at least one of the fixed beamformer (first array-processed signal generating section) 200, the multiple blocking matrix circuit (second array-processed signal generating section), the adaptive blocking matrix circuit 300, and the multi-input canceller (correlation elimination section) 500 to thereby enhance and output the target signal or the interferences clearly.

Further, in the first exemplary embodiment shown in FIG. 1, compared with the above-described conventional example, the multiple blocking matrix circuit 320 configuring a part of the adaptive mode control unit (adaptive array control device) 1200 is completely different from the blocking matrix circuit 310 shown in the above-described FIG. 8 (conventional example). This will be described in detail below.

[Multiple Blocking Matrix Circuit 320: First Example]

Next, the configuration and operation and the like of the multiple blocking matrix circuit 320 will be described in detail.

FIG. 2 shows an exemplary configuration of the multiple blocking matrix circuit 320 shown in FIG. 1. As shown in FIG. 2, the multiple blocking matrix circuit 320 includes subtracters $321_0$ to $321_{M-1}$ and an adder 322. A subtracter i calculates a difference $Z_i(k)=X_0(k)-X_i(k)$ between the first sensor signal $X_0(k)$ and the $i^{th}$ sensor signal $X_i(k)$, and transmits the difference to the adder 322. Here, the symbol is an integer in a range from 0 to M−2. The adder 322 adds all of the M−1 pieces of input signals, and outputs the addition result as $Z(k)$.

As described in the case of conventional blocking matrix circuit 310 (see FIG. 8), each difference becomes $Z_i(k)=0$ with respect to the target signal coming from the front. $Z_i(k)$ will not be zero with respect to interferences coming from other directions. In other words, all of the differences independently work as blocking matrix, respectively. However, respective differences $Z_i(k)$ have different frequency responses and directivity due to the following two reasons.

First, a relative delay between two sensor signals, which are subtracter inputs, is given in the form that a product of a distance between sensors and sin in a signal incoming direction is divided by sound velocity. Further, a distance between sensors differs in all $Z_i(k)$. The frequency characteristics and the directivity of the difference $Z_i(k)$ becomes a function of the distance between sensors. This means the differences $Z_i(k)$, in which distances between sensors are different, have different frequency characteristics and directivity. This is also correct when the subtracters $321_0$ to $321_{M-1}$ are replaced with adders. However, an aspect that the gain becomes an inverse number of the case of subtracters is different. In the case of using adders, a target signal is enhanced. The frequency characteristics and directivity in that case are disclosed in the following document:

"MICROPHONE ARRAYS, CH. 1, FIG. 1.1, SPRINGER-VERLAG, BERLIN, 2001"

In the case of subtracters, it is only necessary to normalize the inverse numbers of the frequency characteristics and the directivity in the above-mentioned document. In this document, if a distance between sensors is constant, it is found that as an input signal frequency becomes higher, the directivity become precipitous. In a lower frequency, the beam angle is wide, and the directivity deteriorate.

By applying this feature to the case of the subtracters $321_0$ to $321_{M-1}$, in a low frequency, the sensitivity is low with respect to a target signal coming from the front, and the sensitivity is high with respect to directions other than the front. However, as transition from a direction of low sensitivity to a direction of high sensitivity is slow, sufficient directivity cannot be obtained. In contrast, if the sensor interval becomes wider, the relative delay becomes larger, so that high directivity can be realized. In other words, precipitous directivity can be achieved.

According to this principle, in the first exemplary embodiment, a plurality of differences between signals obtained from pairs of sensors of different intervals are calculated, and by adding them, a multiple blocking matrix having comprehensively excellent directivity is obtained. The plurality of differences are calculated by the subtracters $321_0$ to $321_{M-1}$, and are added together by the adder 322.

With this configuration, as differences between signal pairs obtained from sensors arranged at wide intervals act effectively on low-frequency signals, and differences between signal pairs obtained from sensors arranged at narrow intervals act effectively on high-frequency signals, excellent directivity can be realized with respect to wideband signals. As such, the multiple blocking matrix circuit 320 can suppress the target signal with excellent frequency characteristics and the directivity.

The first exemplary embodiment is configured such that interference power is accurately estimated using an output of the multiple blocking matrix circuit 320 having such characteristics, and using the result, SIR is calculated by the SIR calculation section 700. As such, by controlling parameters determining the following property and operational accuracy of adaptive filters such as a coefficient update step size and a forgetting coefficient based on an accurate estimated SIR value, coefficient update in the adaptive blocking matrix circuit 300 of the adaptive array processing device and in the multipole input canceller 500 which outputs a target signal can be controlled properly. As a result, it becomes possible to obtain a high-quality array processing output which is less influenced by the frequency characteristics of an input signal and directions of a target signal and interferences.

[Another Exemplary Configuration of Multiple Blocking Matrix Circuit 320: Second Example]

FIG. 3 shows another exemplary configuration of the multiple blocking matrix circuit 320.

The multiple blocking matrix circuit 320 shown in FIG. 3 includes subtracters $321_0$ to $321_{M-1}$, filters $323_0$ to $323_{M-1}$, and an adder 322. A subtracter i calculates a difference $Z_i(k)=X_0(k)-X_i(k)$ between the first sensor signal $X_0(k)$ and the $i^{th}$ sensor signal $X_i(k)$, and transmits the difference to the filter $323_i$. A signal i is an integer in a range from 0 to M−2.

The filter $323_i$ transmits a signal component of a pass band to the adder 322. The adder 322 adds all of the M−1 pieces of input signals, and outputs the addition result as Z(k). The pass band of the filter $323_i$ is determined by the microphone interval between the $0^{th}$ and the $i^{th}$. The filter $323_i$ is designed such that the frequencies in which the directivity determined by the $0^{th}$ and the $i^{th}$ microphone signals, particularly, attenuation characteristics with respect to directions other than the front, become flat with respect to the directions, becomes a pass band.

[Third Example of Multiple Blocking Matrix Circuit 320]

The multiple blocking matrix circuit 320 may have another configuration. In a series array configured of M pieces of sensors, an interval between two sensors is set to be D, 2D, 3D, --- or (M−1)D, from the shortest. There are M−1 pairs of sensors in which the sensor interval is D, and M−2 pairs of sensors in which the sensor interval is 2D, and similarly, there are one pair in which the sensor interval is (M−1)D. Accordingly, the multiple blocking matrix circuit 320 exhibits the above-described effects as long as it has a configuration such that a pair of sensors corresponding to each sensor interval is set, differences between signals obtained therefrom are calculated, and the differences are added by the adder 322. An example of such a configuration is shown in FIG. 4.

In FIG. 4, operation of the subtracters $321_0$ and $321_{M-2}$ is different from that shown in FIG. 3.

Although, in FIG. 3, those subtracters output differential signals corresponding to sensor intervals D and (M−1)D, in FIG. 4, they output differential signals corresponding to sensor intervals (M−1)D and D. Besides, various similar configurations can be adopted.

[Fourth Example of Multiple Blocking Matrix Circuit 320]

Even in the case of a configuration not using signals corresponding to specific sensor intervals among these configurations, a blocking effect of a target signal is higher than that of the conventional blocking matrix circuit 310. FIG. 5 shows an exemplary configuration (fourth example) of such a multiple blocking matrix circuit 320. Compared with FIG. 3, FIG. 5 does not include the subtracter $321_2$. As such, as there is no differential signal corresponding to a sensor interval 2D, no effect caused by the sensor interval 2D is expectable. However, with signals corresponding to other sensor intervals, it is possible to obtain the multiple blocking matrix circuit 320 having comprehensively-excellent directivity, although it is less than the example of FIG. 3.

Although, in the third and fourth examples (FIGS. 4 and 5) of the multiple blocking matrix circuit 320, outputs of the subtracters $321_0$ to $321_{M-1}$ are supplied to the adder 322 via the filters $323_0$ to $323_{M-1}$, a configuration without the filters $323_0$ to $323_{M-1}$ is also possible which is the same as the case of FIG. 2. In FIGS. 4 and 5, those configurations can be achieved by directly connecting all inputs and outputs of the filters $323_0$ to $323_{M-1}$.

Other configurations are the same as those of the conventional case and the like in the above-described FIG. 8.

[Description of Overall Operation]

Next, overall operation of the first exemplary embodiment will be described.

First, when a plurality of signals captured by a group of sensors arranged in an array are transmitted, the receiving section 100 receives and temporarily stores them (step S101). The receiving section has a function capable of regularly receiving a plurality of signals from the group of sensors arranged in an array. The signals of the array-shaped sensors received by the receiving section 100 are transmitted to the fixed beamformer (first array-processed signal generating section) 200, the multiple blocking matrix circuit (second array-processed signal generating section) 320, and the adaptive blocking matrix circuit (interference extraction section) 300, simultaneously.

In the fixed beamformer 200, a target signal included in the transmitted plurality of signals is processed to be enhanced with respect to the other signals, whereby a first array-processed signal is generated (step S102: first array-processed signal generation step).

At the same time, in the multiple blocking matrix circuit (second array-processed signal generating section) 320, the target signal included in the transmitted plurality of signals is attenuated with respect to the other signals, so that the interferences are processed to be enhanced, whereby a second array-processed signal is generated (step S103: second array-processed signal generation step). The second array-processed signal is temporarily stored in the multiple blocking matrix circuit 320.

Further, in the adaptive blocking matrix circuit 300, the target signal included in the transmitted plurality of signals is attenuated with respect to the other signals so that the interferences are enhanced and stored temporarily, and then output to the multi-input canceller 500 at a predetermined timing (step S104).

The respective processing operations of the fixed beamformer 200, the multiple blocking matrix circuit, and the adaptive blocking matrix circuit 300 are simultaneously activated in parallel and are simultaneously executed.

The first array-processed signal, which is generated in the step S102 by enhancing the target signal, is transmitted to the delay element 400, and is transmitted to the multi-input canceller 500 at a predetermined delayed timing (step S105).

At the same time, based on the first array-processed signal which is generated in the step S102 by enhancing the target signal and the second array-processed signal generated by the multiple blocking matrix circuit 320, the ratio of the target signal to the interferences (SIR) is calculated and estimated by the SIR estimating section 700 (step S108: SIR estimation step). In this case, estimation of SIR may be performed by using a predetermined interference (e.g., one estimated beforehand) instead of the second array-processed signal. In that case, in place of the SIR estimation step, a magnitude relationship specifying step to calculate a relative magnitude relationship between the first array-processed signal and the second array-processed signal may be set.

Then, the estimated SIR value (or the magnitude relationship specifying value) estimated in the SIR estimation step is immediately transmitted to the arithmetic control section 800. The arithmetic control section 800 generates a control signal, which functions based on the estimated SIR value (or magnitude relationship specifying value), for setting and controlling a parameter which determines the following speed and the computation accuracy to be in the optimum state in the adaptive array processing of the first array-processed signal in the multi-input canceller 500 (step S107: control signal generation step). In the multi-input canceller 500 to which the control signal is input, setting control is performed to enhance and output the target signal (adaptive array processing controlling step).

In other words, when performing adaptive array processing of the first array-processed signal by the arithmetic control section 800, a coefficient update control of the processing device can be performed properly, and a high-quality array processing output which is less influenced by the frequency characteristics of the input signals and the directions of the target signal and the interferences can be obtained (step S108).

Here, it is also acceptable that the arithmetic control section 800 transmits the control signals to the fixed beamformer 200 and the multiple blocking matrix circuit 320, and controls outputting of the signals or controls enhancing and outputting of at least one of the signals.

As described above, according to the first exemplary embodiment, as each power of the target signal (or target signal and interferences) can be estimated efficiently, it is possible to properly perform a coefficient update control of the processing device, so that a high-quality array processing output which is less influenced by the frequency characteristics of the input signals and the directions of the target signal and interferences can be obtained.

The adaptive mode control unit 1200 has a function of setting a plurality of pairs of sensors having different sensor intervals from a plurality of pieces of array sensor information input, and estimating interference power using each of the pairs of sensors, same as the adaptive mode control unit of each of the exemplary embodiments. As such, with the adaptive mode control unit 1200, it is possible to realize characteristics of high flatness in which different frequency characteristics and directivity are combined, whereby the interference power can be estimated accurately.

As described above, as interference power is estimated by using outputs of a group of sensors having different sensor intervals in the exemplary embodiment of the invention, characteristics with high flatness in which different frequency characteristics and spatially selective characteristics can be realized, so that the interference power can be estimated accurately. As such, it is possible to properly perform a coefficient update control of the adaptive array processing device, so that execution of array processing can be controlled with high-quality, which is less influenced by the frequency characteristics of the interferences and the incoming directions, whereby a high-quality array processing can be obtained.

[Second Exemplary Embodiment]

A second exemplary embodiment of the invention will be described according to FIG. 7.

In this exemplary embodiment, components which function in the same manner as those of the first exemplary embodiment are denoted by the same reference numerals.

The second exemplary embodiment shown in FIG. 7 includes a computer (CPU; processor; processing device main body) 1000 which operates in accordance with a program control, input terminals $101_0$ to $101_{M-1}$, and an output terminal 600.

The computer (CPU; processor; processing device main body) 1000 includes a storage device storing processing programs which function in the same manner as respective functions of the fixed beamformer 200, the adaptive blocking matrix circuit 300, the delay element 400, the multi-input canceller 500, the multiple blocking matrix circuit 320, the SIR estimating section 700, and the arithmetic control section 800 having a comparing function as well, disclosed in the first and second exemplary embodiments, and a central processing unit which executes the processing programs.

The target signal and the interferences supplied to the input terminals $101_0$ to $101_{M-1}$ are supplied to the array processing device 1100 assumed in the processing program within the computer 1000 where the interferences are suppression-processed.

The assumed array processing device 1100 includes, as components, executing contents which are the same as the fixed beamformer 200, the adaptive blocking matrix circuit 300, the delay element 400, and the multi-input canceller 500. Further, in the exemplary embodiment, the adaptive blocking matrix circuit 300 and the multi-input canceller 500 are provided together with an adaptive mode control unit (adaptive array control device) 1200 which controls operations of the adaptive blocking matrix circuit 300 and the multi-input canceller 500.

The adaptive mode control unit 1200 is configured of processing programs including execution contents which are the same as the multiple blocking matrix circuit 320, the SIR estimating section 700, and the arithmetic control section 800 also working as a comparing section, in the first exemplary embodiment.

The adaptive mode control unit 1200 controls the coefficient updating speed and the accuracy of the adaptive filters included in the adaptive blocking matrix circuit 300 and the multi-input canceller 500 of the array processing device.

As described above, as the adaptive mode control unit (adaptive mode control device) 1200 estimates interference power by using outputs of a group of sensors having different sensor intervals in the exemplary embodiment of the invention, characteristics with high flatness in which different frequency characteristics and spatially selective characteristics are combined can be realized, so that the interference power can be estimated accurately. As such, in the adaptive array processing device using the unit, it is possible to properly perform a coefficient update control of the adaptive array processing device, so that execution of array processing can be controlled with high-quality, which is less influenced by the frequency characteristics of the interferences and the incoming directions, whereby a high-quality array processing can be obtained.

Although description has been given above using microphones as sensors, sensors such as ultrasonic sensors, sonar receivers, and antennas may be used instead of microphones.

As described above, as the adaptive array processing device 1100 of the exemplary embodiment has the adaptive mode control unit 1200, it is possible to perform a coefficient update control of the adaptive blocking matrix circuit 300 and the multi-input canceller 500 in the same manner as the case of the respective exemplary embodiments, whereby a high-quality array processing output which is less influenced by the frequency characteristics of the input signals and the directions of the target signal and the interferences can be obtained.

As described above, according to the exemplary embodiment, the interference power, the target signal power, and the ratio between the target signal and the interferences (SIR) can be estimated accurately. As such, it is possible to properly perform coefficient update control, which is less influenced by the frequency characteristics of the input signals and the directions of the target signal and the interferences. Consequently, deterioration of signals and breathing noises in outputs of the array processing device can be reduced effectively.

Figure 1:
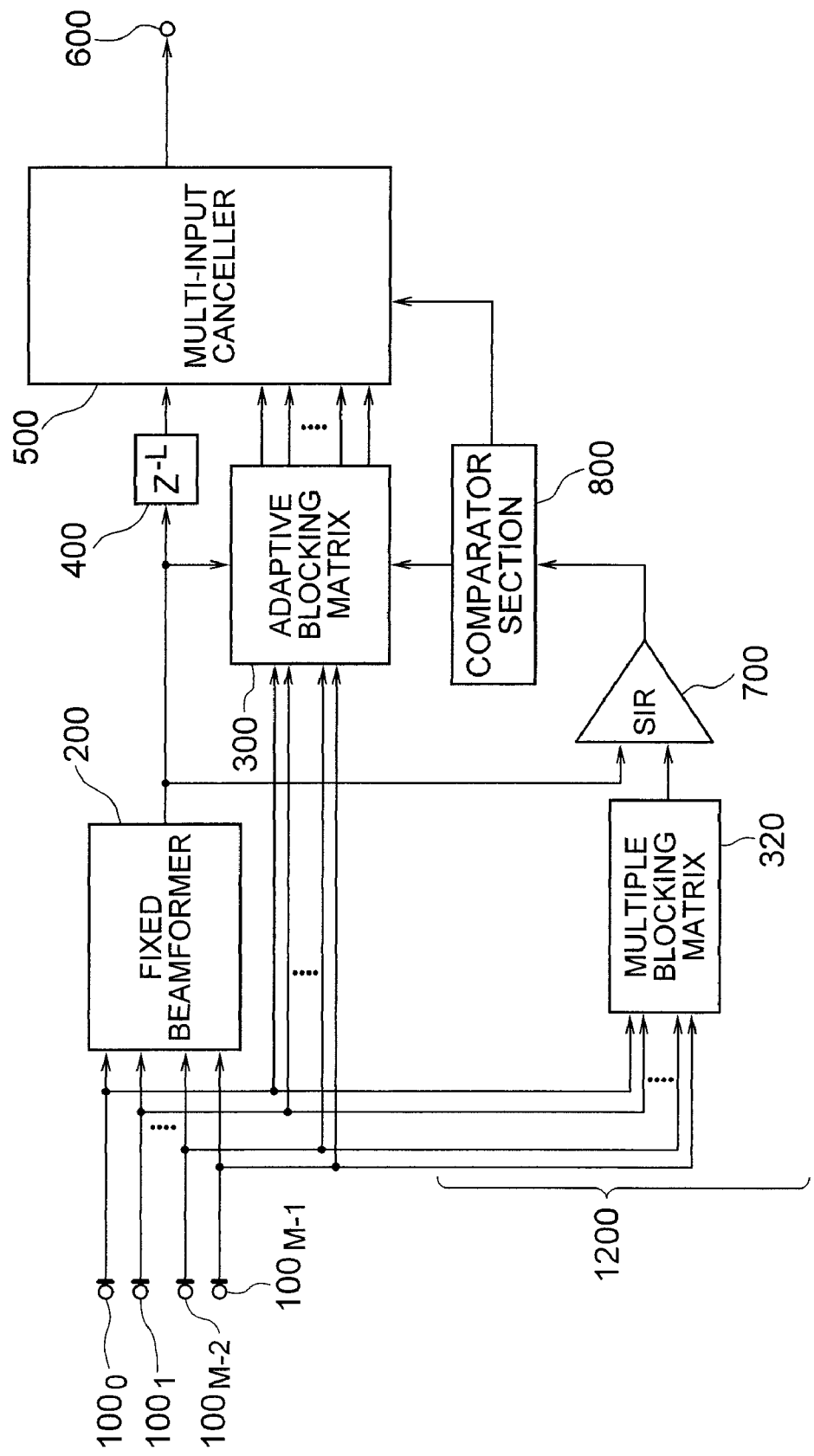
FIG. 1 is a block diagram showing the first exemplary embodiment of the invention.
Figure 2:
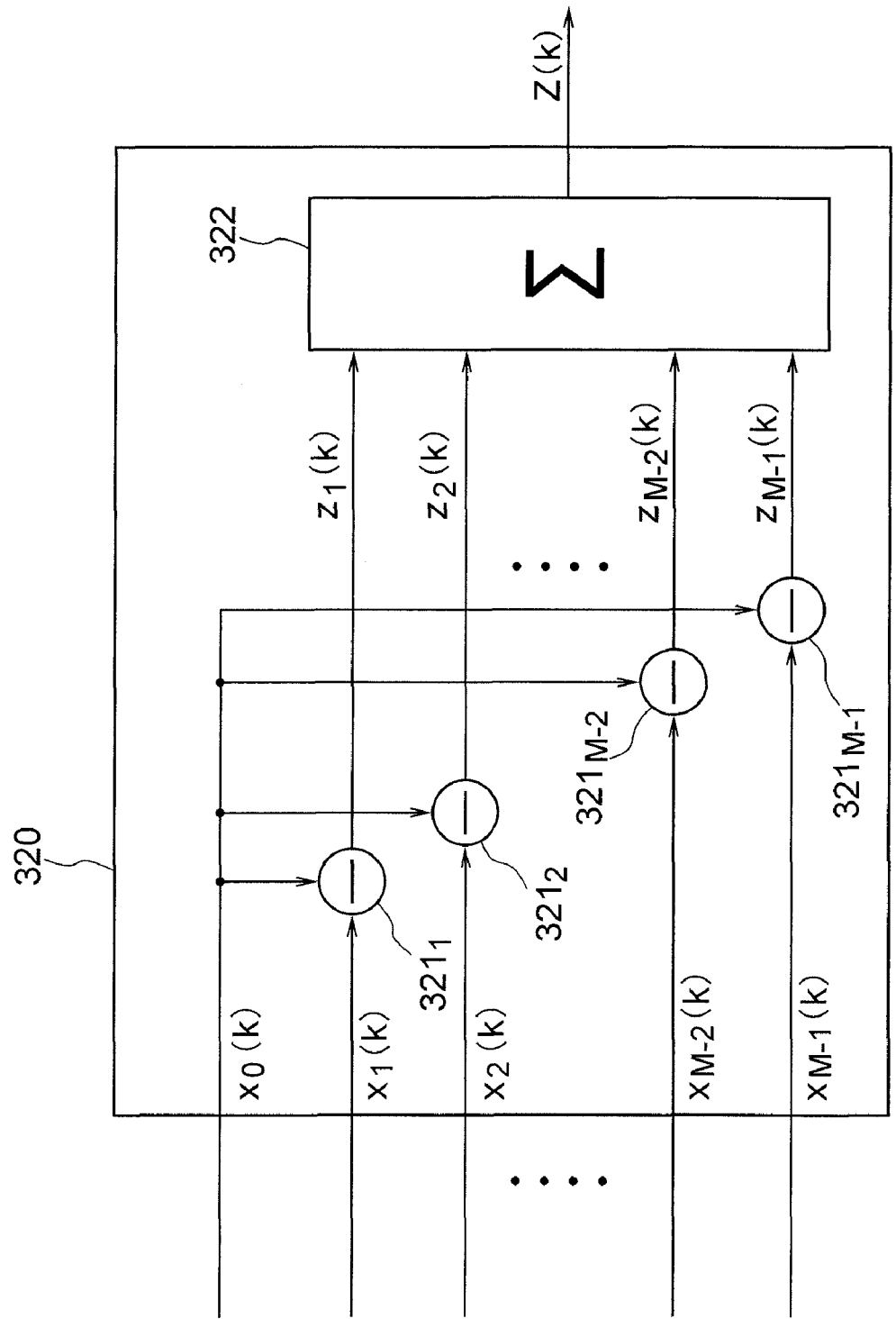
FIG. 2 is a block diagram showing the first exemplary example of the gain control circuit disclosed in FIG. 1.
Figure 3:
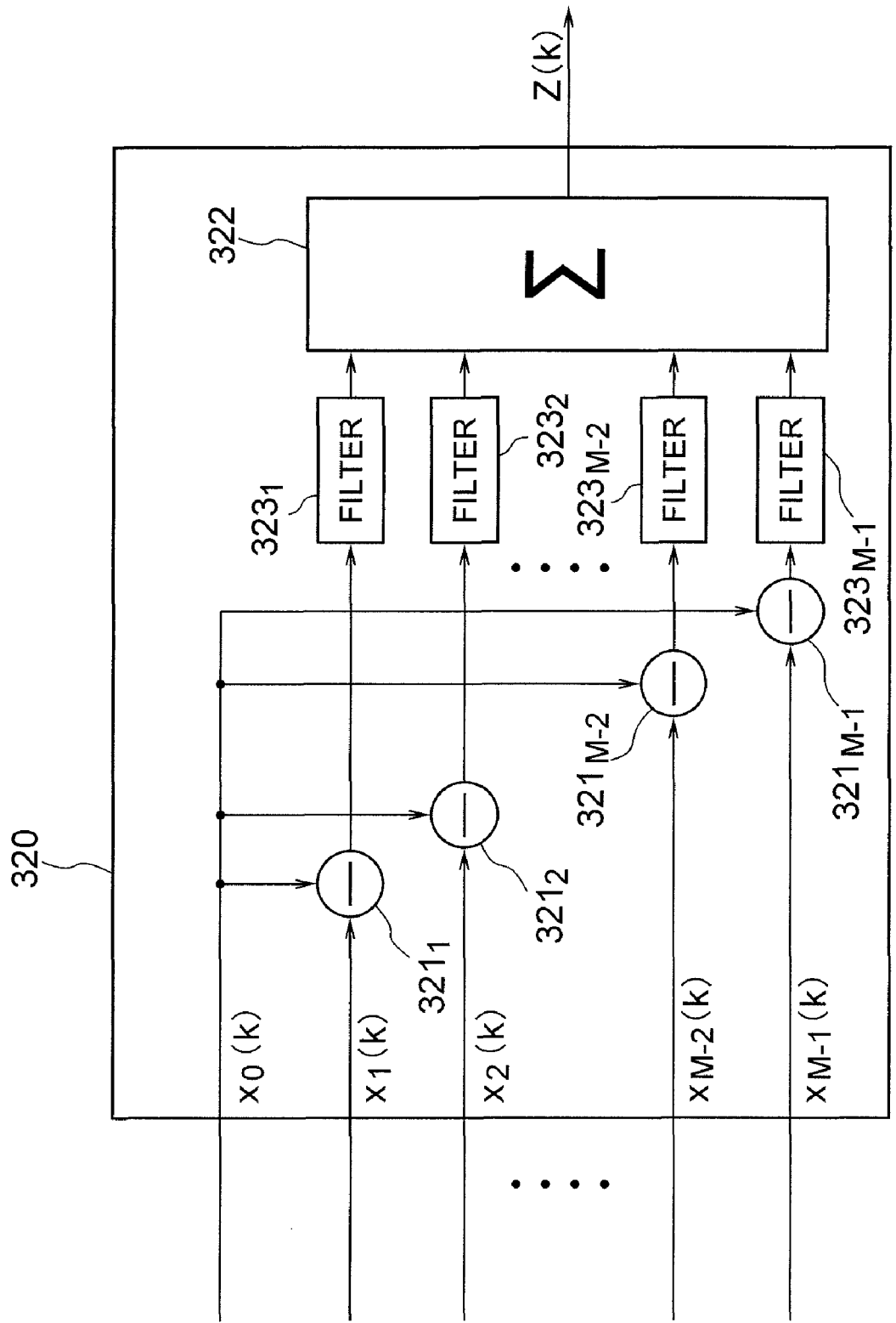
FIG. 3 is a block diagram showing the second example of the gain control circuit disclosed in FIG. 1.
Figure 4:
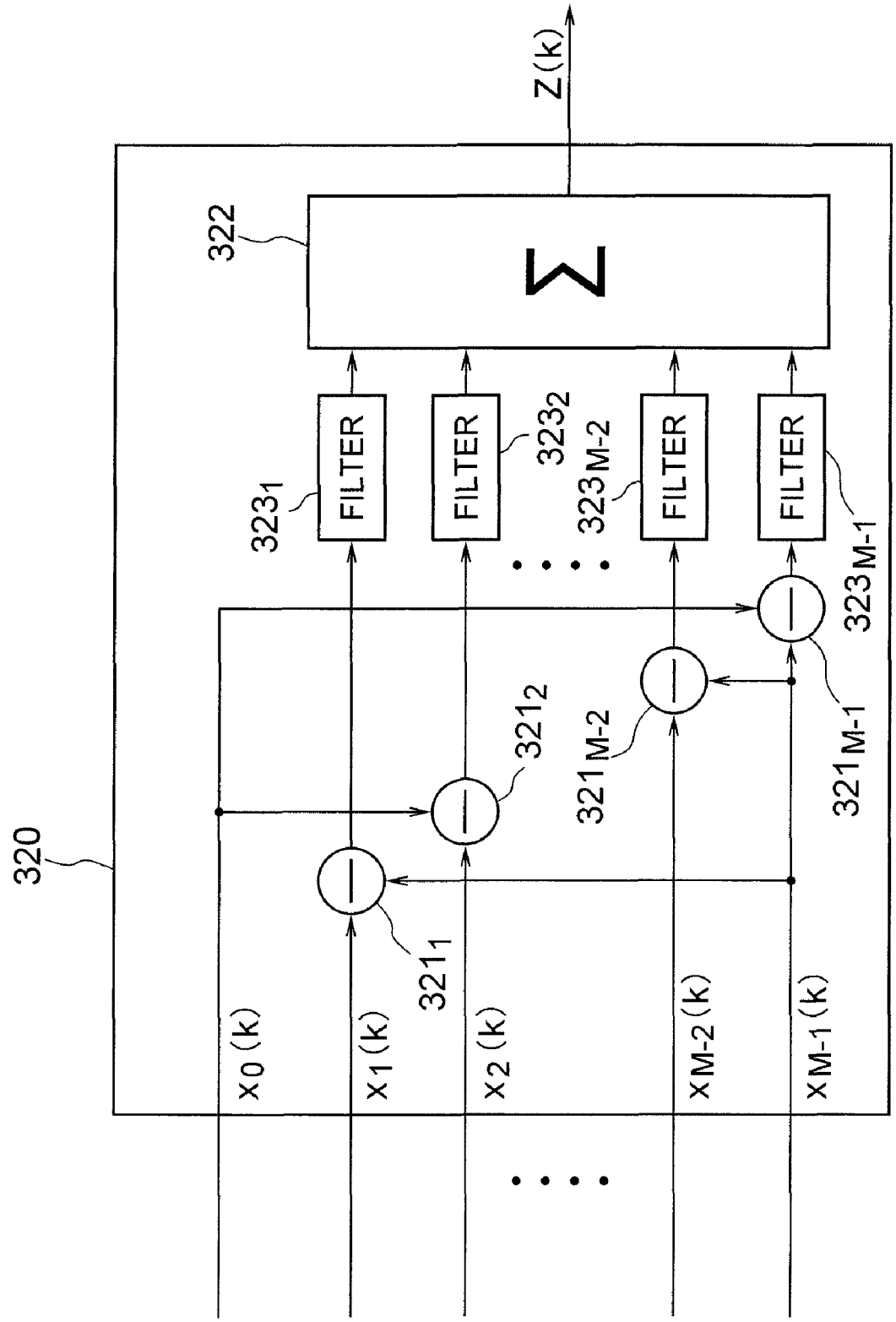
FIG. 4 is a block diagram showing another example (multiple blocking matrix circuit) of the blocking matrix circuit disclosed in FIG. 1.
Figure 5:
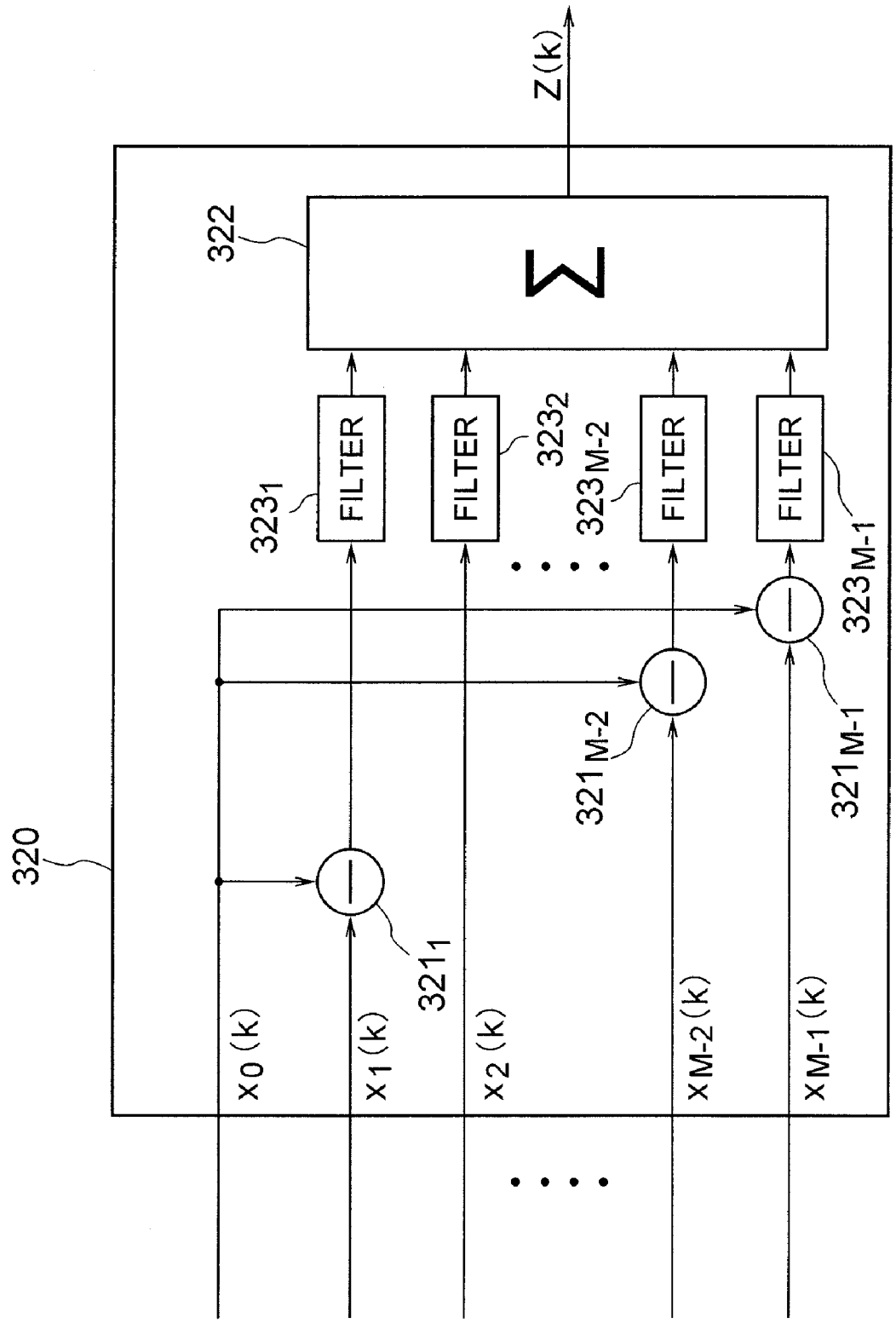
FIG. 5 is a block diagram showing the first specific example of the multiple blocking matrix circuit disclosed in FIG. 4.
Figure 6:
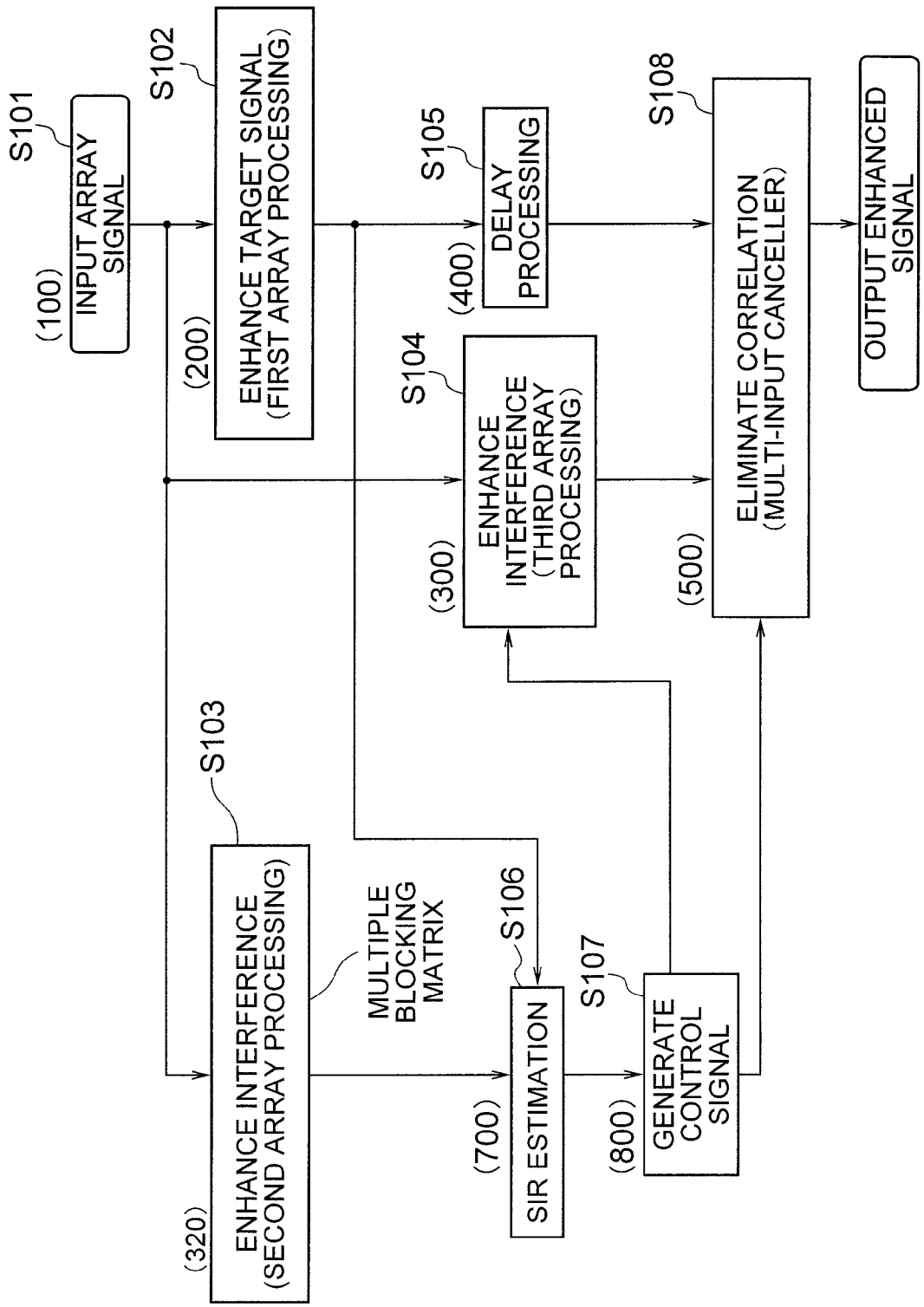
FIG. 6 is a block diagram showing the second specific example of the multiple blocking matrix circuit disclosed in FIG. 4.
Figure 7:
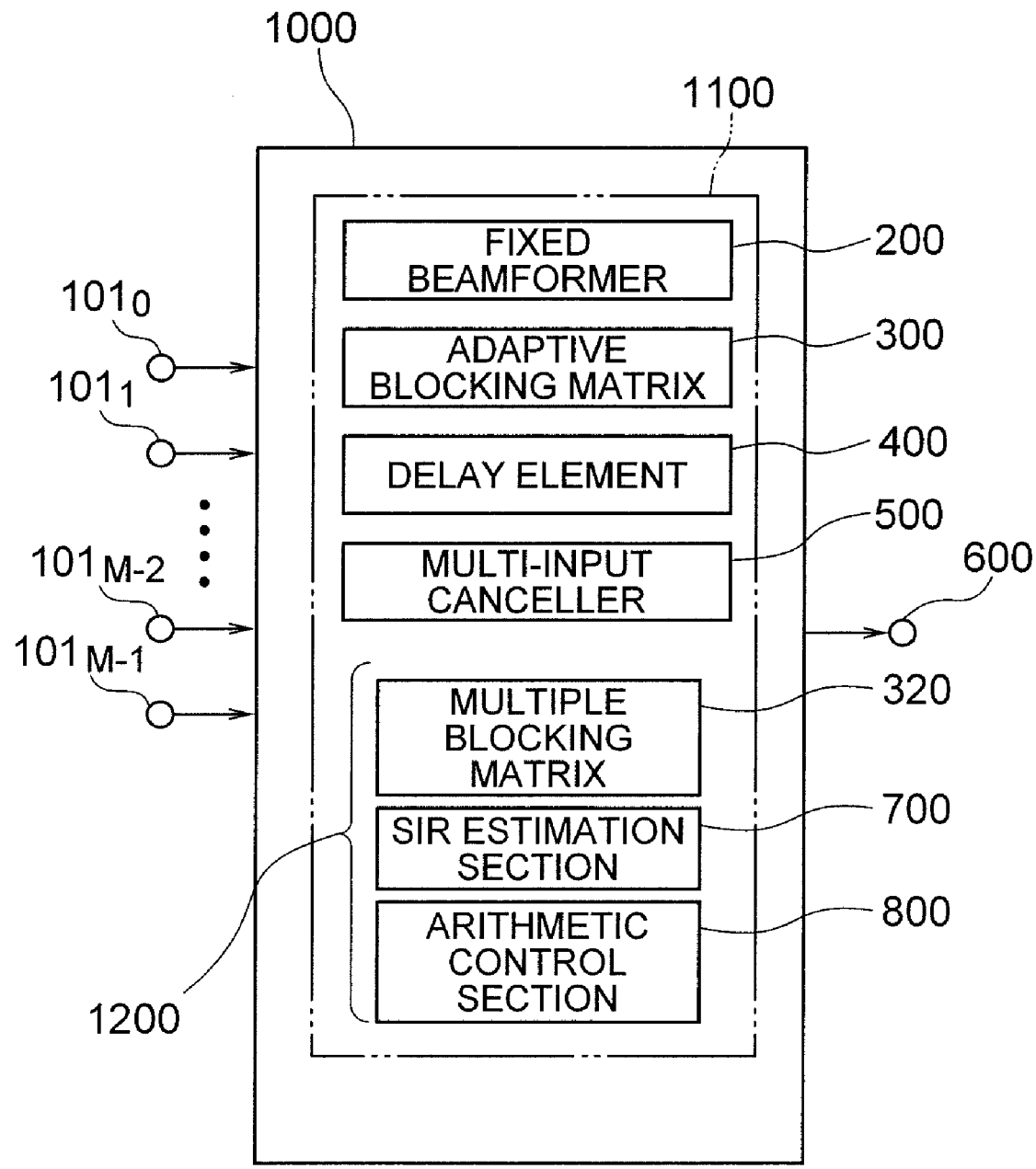
FIG. 7 is a block diagram showing the third specific example of the multiple blocking matrix circuit disclosed in FIG. 4.
Figure 8:
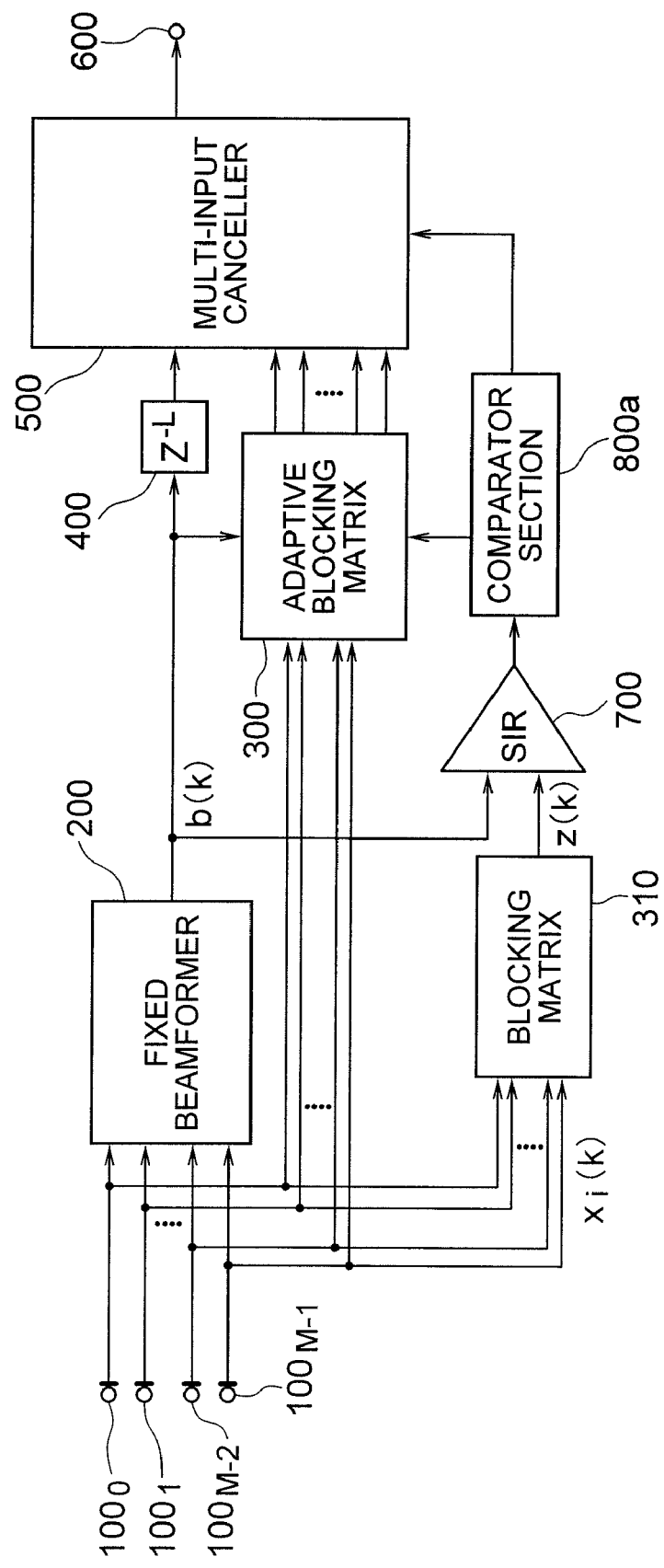
FIG. 8 is a block diagram showing the fourth specific example of the multiple blocking matrix circuit disclosed in FIG. 4.
Figure 9:
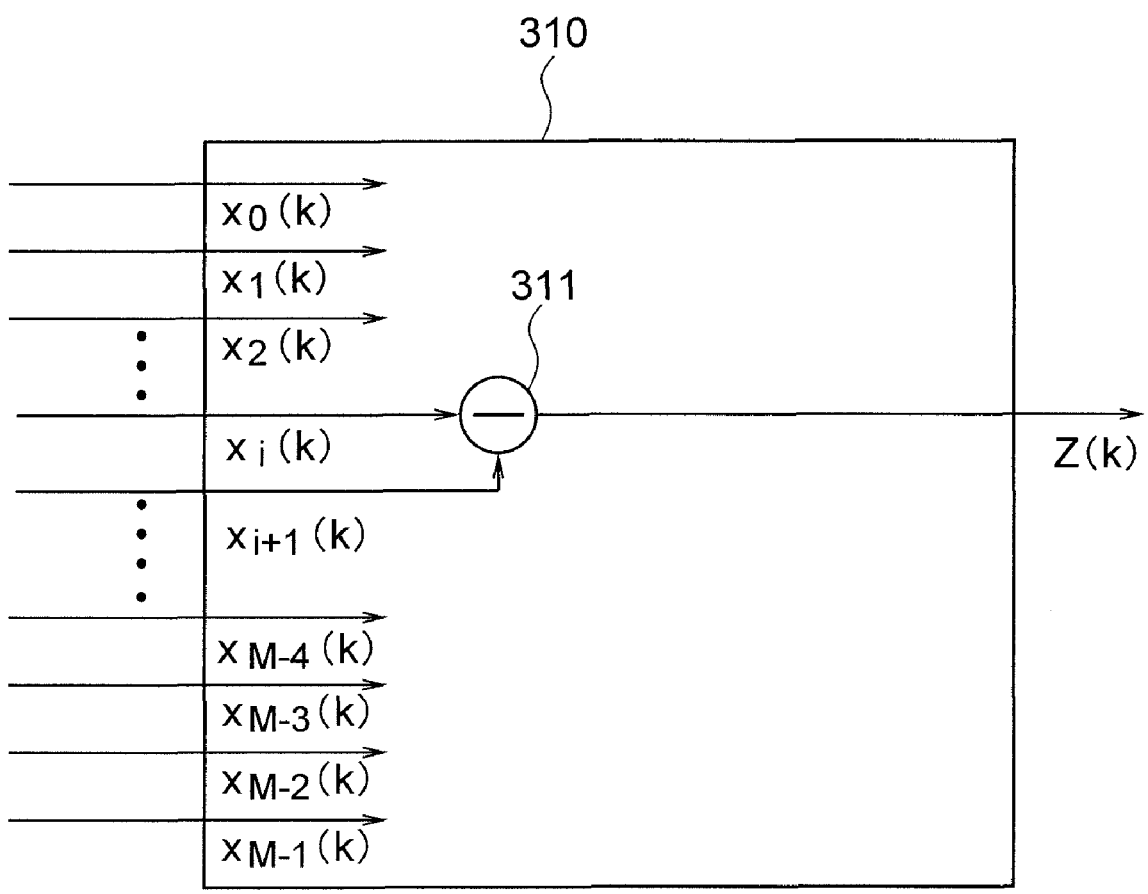
FIG. 9 is a flowchart showing operation of the first exemplary embodiment disclosed in FIG. 1.

DESCRIPTION OF REFERENCE NUMERALS $100_0$~$100_{M-1}$ a plurality of microphones as array sensors
200 fixed beamformer (first array-processed signal generating section)
300 adaptive blocking matrix circuit (third array-processed signal generating section)
320 multiple blocking matrix circuit (second array-processed signal generating section)
311, $321_0$~$321_{M-1}$ subtracter
322 adder
$323_0$~$323_{M-1}$ filter
500 multi-input canceller (adaptive array processing section, correlation elimination section)
700 calculation section for target signal to interference ratio (SIR calculation section, SIR estimating section)
800 arithmetic control section
900 gain control section
1000 computer
1200 adaptive mode control unit (adaptive array control device)

The invention claimed is:

1. An adaptive array control device comprising:
an array processing section which array-processes a signal acquired from a plurality of pairs of sensors having different sensor intervals among a plurality of signals transmitted from a plurality of sensors arranged in an array, and outputs a result as an array-processed signal, and
an arithmetic control section which generates a control signal for controlling speed and accuracy of parameter adjustment in adaptive array processing using an output signal of the array processing section.

2. The adaptive array control device, according to claim 1, wherein the array processing section includes a plurality of filters for filtering respective array processing results, and an adder which adds and outputs filter outputs.

3. The adaptive array control device according to claim 1, further comprising:
an array processing section, which outputs a first array-processed signal generated by enhancing a target signal with respect to other signals using a plurality of signals transmitted from a plurality of sensors arranged in an array; and an calculation section which calculates a relative magnitude relationship between the first array-processed signal and the received first array-processed signal, wherein the arithmetic control section has a control signal generating function to generate a control signal for controlling speed and accuracy of parameter adjustment in adaptive array processing using the magnitude relationship of the processed signals calculated by the calculation section.

4. The adaptive array control device, according to claim 1, further comprising an estimation section which estimates a ratio of the target signal to interference (SIR) according to the first array-processed signal generated by enhancing the target signal with respect to the other signals using the plurality of signals transmitted from the plurality of sensors arranged in an array, wherein the arithmetic control section has a control signal generating function to generate a control signal for controlling speed and accuracy of parameter adjustment in adaptive array processing using the estimated SIR estimate value.

5. An adaptive array control device comprising:

array processing means for array-processing a signal acquired from a plurality of pairs of sensors having different sensor intervals among a plurality of signals transmitted from a plurality of sensors arranged in an array, and outputting a result as an array-processed signal, and arithmetic control means for generating a control signal for controlling speed and accuracy of parameter adjustment in adaptive array processing using an output signal of the array processing means.

6. An adaptive array controlling method comprising:

an array-processed signal generation step for array-processing a signal acquired from a plurality of pairs of sensors having different sensor intervals from a plurality of signals transmitted from a plurality of sensors arranged in an array to thereby generate an array-processed signal in which the target signal is attenuated with respect to the other signals; and an adaptive array processing controlling step for controlling speed and accuracy of parameter adjustment in adaptive array processing using the array-processed signal.

7. The adaptive array controlling method, according to claim 6, wherein an execution content of the array-processed signal generation step is configured to array-process a signal acquired from a plurality of pairs of sensors having different sensor intervals to thereby acquire an array-processed results, filter the array-processed results to thereby acquire a plurality of filtering results, and add the plurality of filtering results to thereby generate the array-processed signal.

8. The adaptive array controlling method, according to claim 6, further comprising:

a first array-processed signal generation step for generating a first array-processed signal generated by enhancing the target signal with respect to other signals among a plurality of signal transmitted from a plurality of sensors arranged in an array;

a second array-processed signal generation step which is the array-processed signal generation step; and before the adaptive array processing controlling step, a magnitude relationship specifying step for comparing the first array-processed signal generated in the first array-processed signal generation step with the second array-processed signal generated in the second array-processed signal generation step to thereby specify a relative magnitude relationship thereof; wherein an execution content of the adaptive array processing controlling step is configured to control speed and accuracy of parameter adjustment in adaptive array processing using the magnitude relationship of respective processed signals specified in the magnitude relationship specifying step.

9. The adaptive array controlling method, according to claim 6, further comprising:

a first array-processed signal generation step for generating a first array-processed signal generated by enhancing the target signal with respect to other signals using a plurality of signals transmitted from a plurality of sensors arranged in an array, a second array-processed signal generation step which is the array-processed signal generation step; and before the adaptive array processing controlling step, an SIR estimation step for estimating a ratio of the target signal to interference (SIR) using the first array-processed signal generated in the first array-processed signal generation step and the second array-processed signal generated in the second array-processed signal generation step, wherein an execution content of the adaptive array processing controlling step is configured to control speed and accuracy of parameter adjustment in adaptive array processing using the SIR estimate value estimated in the SIR estimation step.

10. A computer readable medium storing an adaptive array control program which is configured to cause a computer to execute:

a first array-processed signal generating function to generate a first array-processed signal which is generated by enhancing a target signal with respect to other signals using a plurality of signals transmitted from a plurality of sensors arranged in an array;

a second array-processed signal generating function to generate a result of array-processing a signal acquired from a plurality of pairs of sensors having different sensor intervals, among the plurality of signals, as a second array-processed signal in which the target signal is attenuated with respect to the other signals;

a magnitude relationship specifying function to acquire a relative magnitude relationship between the generated first array-processed signal and the generated second array-processed signal; and an adaptive array controlling function to control speed and accuracy of parameter adjustment in adaptive array processing using the specified magnitude relationship.

11. An adaptive array processing device comprising an array processing section which array-processes a signal acquired from a plurality of pairs of sensors having different sensor intervals among a plurality of signals transmitted from a plurality of sensors arranged in an array, and outputs a result as an array-processed signal.

12. The adaptive array processing device, according to claim 11, wherein the array processing section includes a plurality of filters for filtering the array processing result, and an adder which adds outputs of the filters and outputs.

13. An adaptive array processing device comprising array processing means for array-processing a signal acquired from a plurality of pairs of sensors having different sensor intervals among a plurality of signals transmitted from a plurality of sensors arranged in an array, and outputting a result as an array-processed signal.

14. An adaptive array processing device comprising:
a first array processing section which enhances a target signal with respect to other signals using a plurality of signals transmitted from a plurality of sensors arranged in an array to thereby acquire a first array-processed signal;
a third array processing section which attenuates the target signal with respect to other signals to thereby acquire a third array-processed signal;
a correlation elimination section which eliminates a signal component correlated to the third array-processed signal from the first array-processed signal;
a second array processing section which outputs a result of array-processing a signal acquired from a plurality of pairs of sensors having different sensor intervals, among the plurality of signals, as a second array-processed signal; and
an arithmetic control section which generates a control signal for controlling speed and accuracy of parameter adjustment in adaptive array processing using an output signal of the second array processing section.

15. An adaptive array processing device comprising:
a first array processing generation section which enhances a target signal with respect to other signals using a plurality of signals transmitted from a plurality of sensors arranged in an array to thereby acquire a first array-processed signal;
a third array processing generation section which attenuates the target signal with respect to other signals to thereby generate a third array-processed signal;
a correlation elimination section which eliminates a signal component correlated to the third array-processed signal from the first array-processed signal;
a second array processing section which outputs a result of array-processing a signal acquired from a plurality of pairs of sensors having different sensor intervals, among the plurality of signals, as a second array-processed signal;
a calculation section which calculates a relative magnitude relationship between the first array-processed signal and the second array-processed signal; and
an arithmetic control section which generates a control signal for controlling speed and accuracy of parameter adjustment in adaptive array processing using a magnitude relationship between the first array-processed signal and the second array-processed signal.

16. An adaptive array processing device comprising:
a first array processing generation section which enhances a target signal with respect to other signals using a plurality of signals transmitted from a plurality of sensors arranged in an array to thereby acquire a first array-processed signal;
a third array processing generation section which attenuates the target signal with respect to other signals to thereby generate a third array-processed signal;
a correlation elimination section which eliminates a signal component correlated to the third array-processed signal from the first array-processed signal;
a second array processing section which outputs a result of array-processing a signal acquired from a plurality of pairs of sensors having different sensor intervals, among the plurality of signals, as a second array-processed signal;
an SIR estimation section which estimates a ratio of the target signal to interference (SIR) using the second array-processed signal; and
an arithmetic control section which generates a control signal for controlling speed and accuracy of parameter adjustment in adaptive array processing using the SIR estimate value estimated in the SIR estimation section.

17. The adaptive array processing device, according to claim 14, wherein
the second array processing section includes a plurality of filters for filtering the array processing result respectively, and an adder which adds outputs of the filters and outputs.

18. An adaptive array processing device comprising:
first array processing means for enhancing a target signal with respect to other signals using a plurality of signals transmitted from a plurality of sensors arranged in an array to thereby acquire a first array-processed signal;
third array processing means for attenuating the target signal with respect to other signals to thereby acquire a third array-processed signal;
correlation elimination means for eliminating a signal component correlated to the third array-processed signal from the first array-processed signal;
second array processing means for outputting a result of array-processing a signal acquired from a plurality of pairs of sensors having different sensor intervals, among the plurality of signals, as a second array-processed signal; and
arithmetic control means for generating a control signal for controlling speed and accuracy of parameter adjustment in adaptive array processing using an output signal of the second array processing means.

19. An adaptive array processing device comprising:
first array processing generation means for enhancing a target signal with respect to other signals using a plurality of signals transmitted from a plurality of sensors arranged in an array to thereby acquire a first array-processed signal;
third array processing generation means for attenuating the target signal with respect to other signals to thereby generate a third array-processed signal;
correlation elimination means for eliminating a signal component correlated to the third array-processed signal from the first array-processed signal;
second array processing means for outputting a result of array-processing a signal acquired from a plurality of pairs of sensors having different sensor intervals, among the plurality of signals, as a second array-processed signal;
calculation means for calculating a relative magnitude relationship between the first array-processed signal and the second array-processed signal; and
arithmetic control means for generating a control signal for controlling speed and accuracy of parameter adjustment in adaptive array processing using a magnitude relationship between the first array-processed signal and the second array-processed signal.

20. An adaptive array processing device comprising:
first array processing generation means for enhancing a target signal with respect to other signals using a plurality of signals transmitted from a plurality of sensors arranged in an array to thereby acquire a first array-processed signal;
third array processing generation means for attenuating the target signal with respect to other signals to thereby generate a third array-processed signal;
correlation elimination means for eliminating a signal component correlated to the third array-processed signal from the first array-processed signal;

second array processing means for outputting a result of array-processing a signal acquired from a plurality of pairs of sensors having different sensor intervals, among the plurality of signals, as a second array-processed signal;

SIR estimation means for estimating a ratio of the target signal to interference (SIR) using the second array-processed signal; and arithmetic control means for generating a control signal for controlling speed and accuracy of parameter adjustment in adaptive array processing using the SIR estimate value estimated in the SIR estimation means.

21. An adaptive array processing method comprising:

an array-processed signal generation step which array-processes a signal acquired from a plurality of pairs of sensors having different sensor intervals among a plurality of signals transmitted from a plurality of sensors arranged in an array to thereby generate an array-processed signal; and an array-processed signal outputting step for outputting an array processing result obtained in the array-processed signal generation step as an array-processed signal, wherein an execution content of the array-processed signal generation step is configured to generate the array-processed signal in a state that a target signal among the plurality of signals is attenuated with respect to other signals.

22. An adaptive array processing method comprising:

an array-processed signal generation step for array-processing a signal acquired from a plurality of pairs of sensors having different sensor intervals among a plurality of signals transmitted from a plurality of sensors arranged in an array to thereby generate an array-processed signal; and an array-processed signal outputting step for outputting an array processing result obtained in the array-processed signal generation step as an array-processed signal, wherein an execution content of the array-processed signal generation step is configured to filter respective array processing results to acquire a plurality of filtering results, and add the plurality of filtering results to thereby generate the array-processed signal.

23. An adaptive array processing method comprising:

a first array-processed signal generation step for enhancing a target signal with respect to other signals using a plurality of signal transmitted from a plurality of sensors arranged in an array to thereby generate a first array-processed signal;

a third array-processed signal generation step for attenuating the target signal with respect to other signals to thereby generate a third array-processed signal;

a second array-processed signal generation step for, when eliminating a signal component correlated to the third array-processed signal from the first array-processed signal and outputting the first array-processed signal, array-processing a signal acquired from a plurality of pairs of sensors having different sensor intervals among the plurality of received array signals to acquire an array processing result, and setting the array processing results as a second array-processed signal in which the target signal is attenuated with respect to the other signals; and a magnitude relationship specifying step for calculating a relative magnitude relationship between the first array-processed signal and the second array-processed signal; and an adaptive array processing controlling step for controlling speed and accuracy of parameter adjustment in adaptive array processing using the specified magnitude relationship.

24. An adaptive array processing method comprising:

a first array-processed signal generation step for enhancing a target signal with respect to other signals using a plurality of signal transmitted from a plurality of sensors arranged in an array to thereby generate a first array-processed signal;

a third array-processed signal generation step for attenuating the target signal with respect to other signals to thereby generate a third array-processed signal;

a second array-processed signal generation step for, when eliminating a signal component correlated with the third array-processed signal from the first array-processed signal and outputting the first array-processed signal, array-processing a signal acquired from a plurality of pairs of sensors having different sensor intervals among the plurality of received array signals to acquire an array processing result, and setting the array processing result as a second array-processed signal in which the target signal is attenuated with respect to the other signals;

an SIR estimation step for estimating a ratio of the target signal to interference (SIR) using the second array-processed signal; and an adaptive array processing controlling step for controlling speed and accuracy of parameter adjustment in adaptive array processing using the estimated SIR estimate value.

25. The adaptive array processing method, according to claim 22, wherein an execution content of the second array-processed signal generation step is configured to filter the array processing results respectively to acquire a plurality of filtering results, and to acquire the second array-processed signal using a sum of the plurality of filtering results.

26. A computer readable medium storing an adaptive array processing program configured to cause a computer to execute:

a first array-processed signal generating function to enhance a target signal, among a plurality of signals transmitted from a plurality of sensors arranged in an array, with respect to other signals to thereby acquire a first array-processed signal;

a third array-processed signal generating function to attenuate the target signal with respect to other signals to thereby generate a third array-processed signal;

a correlated component elimination function to eliminate and output a signal component correlated to the third array-processed signal from the first array-processed signal;

a second array-processed signal specifying function to specify a result of array-processing a signal acquired from the plurality of the pairs of sensors having different sensor intervals among a plurality of signals transmitted from the plurality of sensors arranged in an array as a second array-processed signal in which the target signal is attenuated with respect to the other signals;

a magnitude relationship specifying function to specify a relative magnitude relationship between the first array-processed signal and the second array-processed signal; and an adaptive array-processed controlling function to control speed and accuracy of parameter adjustment in adaptive array processing using the specified magnitude relationship.

* * * * *